United States Patent
Cho et al.

(10) Patent No.: US 8,843,145 B2
(45) Date of Patent: Sep. 23, 2014

(54) METHOD AND APPARATUS FOR TRANSMITTING DATA USING GUARD PHYSICAL RESOURCE UNITS IN MULTIPLE-CARRIER SYSTEM

(75) Inventors: Han Gyu Cho, Gyeongki-do (KR); Jin Soo Choi, Gyeongki-do (KR); Jin Sam Kwak, Gyeongki-do (KR); Young Soo Yuk, Gyeongki-do (KR); Sung Ho Moon, Gyeongki-do (KR)

(73) Assignee: LG Electronics Inc., Seoul (KR)

( * ) Notice: Subject to any disclaimer, the term of this patent is extended or adjusted under 35 U.S.C. 154(b) by 757 days.

(21) Appl. No.: 13/127,866

(22) PCT Filed: Nov. 4, 2009

(86) PCT No.: PCT/KR2009/006450
§ 371 (c)(1),
(2), (4) Date: May 5, 2011

(87) PCT Pub. No.: WO2010/053289
PCT Pub. Date: May 14, 2010

(65) Prior Publication Data
US 2011/0207496 A1   Aug. 25, 2011

Related U.S. Application Data

(60) Provisional application No. 61/112,188, filed on Nov. 7, 2008, provisional application No. 61/120,024, filed on Dec. 4, 2008, provisional application No. 61/237,660, filed on Aug. 27, 2009, provisional application No. 61/251,706, filed on Oct. 14, 2009, provisional application No. 61/254,743, filed on Oct. 25, 2009, provisional application No. 61/238,200, filed on Aug. 30, 2009.

(51) Int. Cl.
*H04W 72/00* (2009.01)
*H04L 5/00* (2006.01)
*H04L 27/26* (2006.01)

(52) U.S. Cl.
CPC ............ *H04L 5/0007* (2013.01); *H04L 5/0053* (2013.01); *H04L 27/2605* (2013.01)
USPC ............ 455/450; 455/464; 455/509; 370/329

(58) Field of Classification Search
None
See application file for complete search history.

(56) References Cited

U.S. PATENT DOCUMENTS

2005/0271152 A1   12/2005   Kim et al.
2009/0016371 A1*   1/2009   Zheng et al. .................. 370/431

FOREIGN PATENT DOCUMENTS

| KR | 10-2006-0129004 | 12/2006 |
| WO | 2005/088853 | 9/2005 |
| WO | 2008/039096 | 4/2008 |

OTHER PUBLICATIONS

Kim et al., Design of Resource Allocation Unit Structure for IEEE 802.16m, Mar. 10, 2008, IEEE C802.16m-08/188, pp. 1-19.*
International Search Report from PCT/KR2009/006450 (PCT corresponding to present application), Jun. 10, 2010.

* cited by examiner

*Primary Examiner* — Nay A Maung
*Assistant Examiner* — Alejandro Rivero
(74) *Attorney, Agent, or Firm* — Morgan, Lewis & Bockius LLP

(57) ABSTRACT

Provided are a method and a device for data transmission in a multiple carrier wave system. With respect to a carrier wave that includes a first guard band, a data band, and a second guard band on a frequency domain, at least one guard physical resource unit (guard PRU) is allocated to at least one of said first guard band and said second guard band, said guard PRU is mapped to a contiguous resource unit (CRU), and data are transmitted via the CRU to which said guard PRU is mapped. The CRU to which said guard PRU has been mapped is mapped to a contiguous logical resource unit (CLRU). The index of the CRU to which said guard PRU has been mapped and the index of the CRU to which the PRU of said data band has been mapped may be continuous.

17 Claims, 25 Drawing Sheets

METHOD AND APPARATUS FOR TRANSMITTING DATA USING GUARD PHYSICAL RESOURCE UNITS IN MULTIPLE-CARRIER SYSTEM

CROSS-REFERENCE TO RELATED APPLICATIONS

This application claims the benefit of priority of U.S. Provisional application No. 61/112,188 filed on Nov. 7, 2008, U.S. Provisional application No. 61/120,024 filed on Dec. 4, 2008, U.S. Provisional application No. 61/237,660 filed on Aug. 27, 2009, U.S. Provisional application No. 61/238,200 filed on Aug. 30, 2009, U.S. Provisional application No. 61/251,706 filed on Oct. 14, 2009, and U.S. Provisional application No. 61/254,743 filed on Oct. 25, 2009, all of which are incorporated by reference in their entirety herein.

BACKGROUND OF THE INVENTION

1. Field of the Invention

The present invention relates to wireless communications, and more particularly, to a method and apparatus for data transmission in a multiple-carrier system.

2. Related Art

The institute of electrical and electronics engineers (IEEE) 802.16e standard was adopted in 2007 as a sixth standard for international mobile telecommunication (IMT)-2000 in the name of 'WMAN-OFDMA TDD' by the ITU-radio communication sector (ITU-R) which is one of sectors of the international telecommunication union (ITU). An IMT-advanced system has been prepared by the ITU-R as a next generation (i.e., $4^{th}$ generation) mobile communication standard following the IMT-2000. It was determined by the IEEE 802.16 working group (WG) to conduct the 802.16m project for the purpose of creating an amendment standard of the existing IEEE 802.16e as a standard for the IMT-advanced system. As can be seen in the purpose above, the 802.16m standard has two aspects, that is, continuity from the past (i.e., the amendment of the existing 802.16e standard) and continuity to the future (i.e., the standard for the next generation IMT-advanced system). Therefore, the 802.16m standard needs to satisfy all requirements for the IMT-advanced system while maintaining compatibility with a mobile WiMAX system conforming to the 802.16e standard.

Effective transmission/reception methods and utilizations have been proposed for a broadband wireless communication system to maximize efficiency of radio resources. An orthogonal frequency division multiplexing (OFDM) system capable of reducing inter-symbol interference (ISI) with a low complexity is taken into consideration as one of next generation wireless communication systems. In the OFDM, a serially input data symbol is converted into N parallel data symbols, and is then transmitted by being carried on each of separated N subcarriers. The subcarriers maintain orthogonality in a frequency dimension. Each orthogonal channel experiences mutually independent frequency selective fading, and an interval of a transmitted symbol is increased, thereby minimizing inter-symbol interference.

When a system uses the OFDM as a modulation scheme, orthogonal frequency division multiple access (OFDMA) is a multiple access scheme in which multiple access is achieved by independently providing some of available subcarriers to a plurality of users. In the OFDMA, frequency resources (i.e., subcarriers) are provided to the respective users, and the respective frequency resources do not overlap with one another in general since they are independently provided to the plurality of users. Consequently, the frequency resources are allocated to the respective users in a mutually exclusive manner. In an OFDMA system, frequency diversity for multiple users can be obtained by using frequency selective scheduling, and subcarriers can be allocated variously according to a permutation rule for the subcarriers. In addition, a spatial multiplexing scheme using multiple antennas can be used to increase efficiency of a spatial domain.

Meanwhile, a radio resource can be divided into a plurality of frequency partitions (FPs) when providing services such as multicast and broadcast services (MBS). This is called fractional frequency reuse (FFR). Each FP can be used for a different usage. In each FP, a distributed subchannel and a localized subchannel may coexist in a frequency division multiplexing (FDM) manner. In addition, each FP can configure a subchannel on the basis of a different-sized resource granularity. When the subchannel is configured, there is a need to consider various factors and a trade-off based on the various factors.

In addition, an IEEE 802.16m system may consider not only a single carrier but also multiple carriers. According to a user equipment, only one carrier may be accessed or several carriers may be accessed. When supporting multiple carriers, a guard subcarrier may be allocated to decrease interference between carriers. However, for effective resource utilization, there is a need to use the guard subcarrier in data transmission.

Accordingly, there is a need for effective subchannelization considering a guard subcarrier when supporting multiple carriers.

SUMMARY OF THE INVENTION

The present invention provides a method and apparatus for data transmission in a multiple-carrier system.

In an aspect, a method of transmitting data in a multiple-carrier system is provided. The method include allocating at least one guard physical resource unit (PRU) including a plurality of contiguous subcarriers to at least one of the first guard band or the second guard band, a carrier including the first guard band, a data band and the second guard band on a frequency domain, mapping the guard PRU to a contiguous resource unit (CRU), and transmitting data by using the CRU to which the guard PRU is mapped, wherein the CRU to which the guard PRU is mapped is mapped to a contiguous logical resource unit (CLRU). The multiple-carrier system may include a plurality of frequency partitions, and a frequency partition including the CRU to which the guard PRU is mapped is a reuse-1 region among the plurality of frequency partitions. The guard PRU may consist of 18 physically contiguous subcarriers. The CRU to which the guard PRU is mapped may be contiguous to the CRU to which the data band PRU is mapped.

Also, the method may further include allocating the CRU to which the guard PRU is mapped to each user equipment according to an index order of the CRU to which the data band PRU is mapped. The CRU to which the guard PRU is mapped may be allocated together with the CRU to which the data band PRU is mapped. The index order may be a descending order starting from a greatest index among indices of CRUs to which the data band PRU is mapped. The CRU to which the guard PRU is mapped may be allocated in turn by pairing a PRU belonging to the first guard band and a PRU belonging to the second guard band. The CRU to which the guard PRU is mapped may be allocated in such a manner that a PRU belonging to the first guard band and a PRU belonging to the second guard band are allocated in turn.

In another aspect, a transmitter in a multiple-carrier system is provided. The transmitter includes a radio frequency (RF) unit, and a processor, coupled to the RF unit, and configured for allocating at least one guard physical resource unit (PRU) including a plurality of adjacent subcarriers to at least one of a first guard band and a second guard band on a frequency domain, mapping the guard PRU to a contiguous resource unit (CRU), and transmitting data by using the CRU to which the guard PRU is mapped, wherein the CRU to which the guard PRU is mapped is mapped to a contiguous logical resource unit (CLRU).

Resources can be effectively used by using a guard subcarrier in data transmission while minimizing an influence to subchannelization of a data resource region for the conventional data transmission.

DESCRIPTION OF EXEMPLARY EMBODIMENTS

A technology below can be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented using radio technology, such as Universal Terrestrial Radio Access (UTRA) or CDMA2000. TDMA can be implemented using radio technology, such as Global System for Mobile communications (GSM)/General Packet Radio Service (GPRS)/Enhanced Data Rates for GSM Evolution (EDGE). OFDMA can be implemented using radio technology, such as IEEE 802.11 (Wi-Fi), IEEE 802.16(WiMAX), IEEE 802-20, or Evolved UTRA (E-UTRA). IEEE 802.16m is the evolution of IEEE 802.16e, and it provides a backward compatibility with an IEEE 802.16e-based system. UTRA is part of a Universal Mobile Telecommunications System (UMTS). 3rd Generation Partnership Project (3GPP) Long Term Evolution (LET) is part of Evolved UMTS (E-UMTS) using Evolved-UMTS Terrestrial Radio Access (E-UTRA), and it adopts OFDMA in downlink (DL) and SC-FDMA in uplink (UL). LTE-A (Advanced) is the evolution of 3GPP LTE.

IEEE 802.16m is chiefly described as an example in order to clarify the description, but the technical spirit of the present invention is not limited to IEEE 802.16m.

Figure 1:
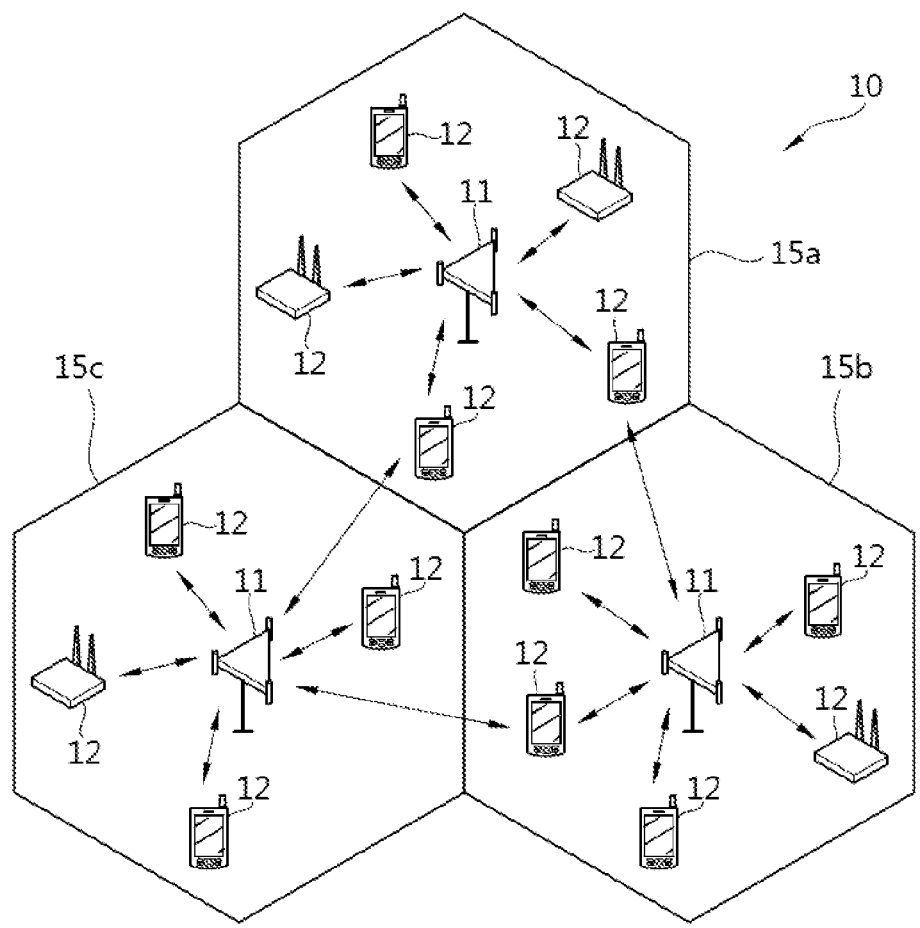
FIG. 1 shows a wireless communication system.

FIG. 1 shows a wireless communication system.

Referring to FIG. 1, the wireless communication system 10 includes one or more Base Stations (BSs) 11. The BSs 11 provide communication services to respective geographical areas (in general called 'cells') 15a, 15b, and 15c. Each of the cells can be divided into a number of areas (called 'sectors'). A User Equipment (UE) 12 can be fixed or mobile and may be referred to as another terminology, such as a Mobile Station (MS), a Mobile Terminal (MT), a User Terminal (UT), a Subscriber Station (SS), a wireless device, a Personal Digital Assistant (PDA), a wireless modem, or a handheld device. In general, the BS 11 refers to a fixed station that communicates with the UEs 12, and it may be referred to as another terminology, such as an evolved-NodeB (eNB), a Base Transceiver System (BTS), or an access point.

The UE belongs to one cell. A cell to which a UE belongs is called a serving cell. A BS providing the serving cell with communication services is called a serving BS. A wireless communication system is a cellular system, and so it includes other cells neighboring a serving cell. Other cells neighboring the serving cell are called neighbor cells. A BS providing the neighbor cells with communication services is called as a neighbor BS. The serving cell and the neighbor cells are relatively determined on the basis of a UE.

This technology can be used in the downlink (DL) or the uplink (UL). In general, DL refers to communication from the BS 11 to the UE 12, and UL refers to communication from the UE 12 to the BS 11. In the DL, a transmitter may be part of the BS 11 and a receiver may be part of the UE 12. In the UL, a transmitter may be part of the UE 12 and a receiver may be part of the BS 11.

Figure 2:
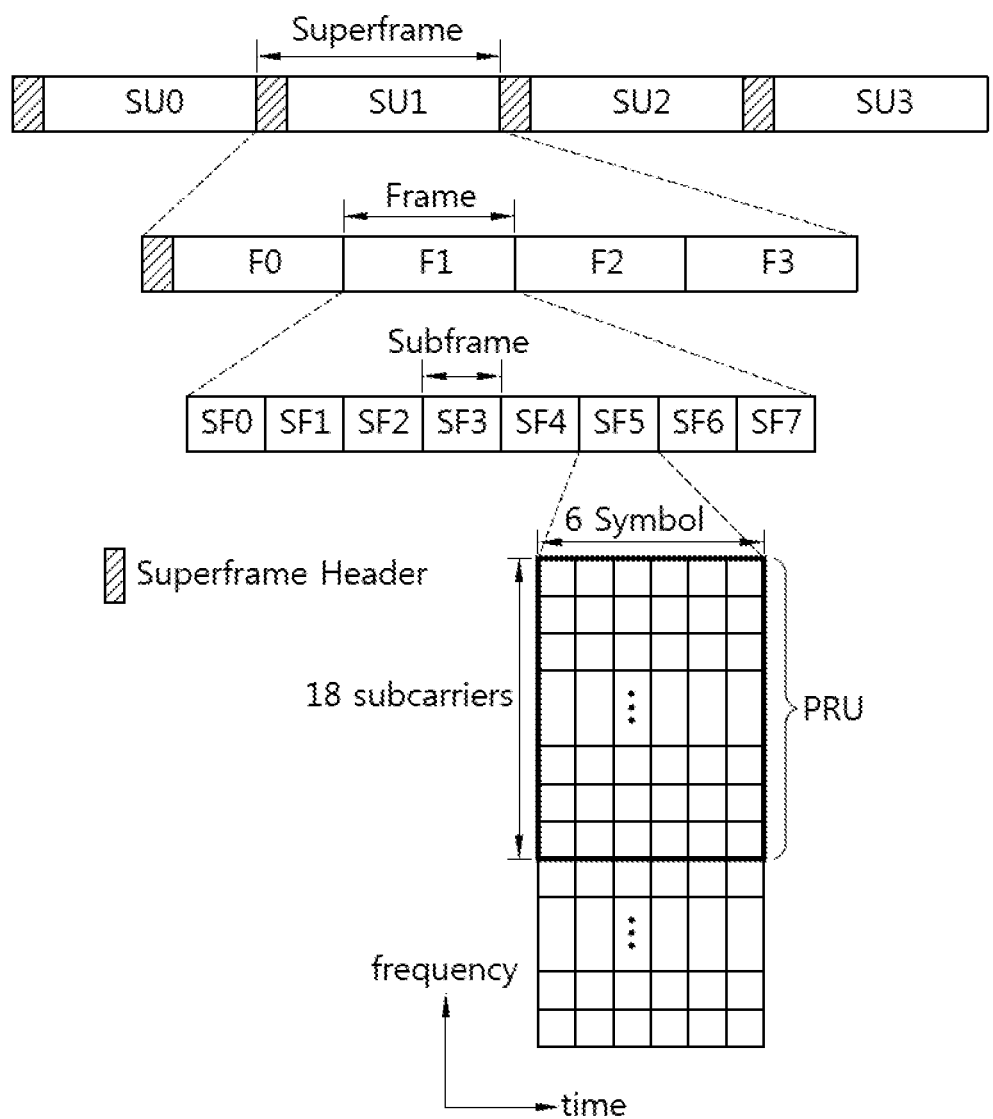
FIG. 2 shows an example of a frame structure.

FIG. 2 shows an example of a frame structure.

Referring to FIG. 2, a superframe (SF) includes a superframe header (SFH) and four frames F0, F1, F2, and F3. Each frame may have the same length in the SF. Although it is shown that each SF has a length of 20 milliseconds (ms) and each frame has a length of 5 ms, the present invention is not limited thereto. A length of the SF, the number of frames included in the SF, the number of SFs included in the frame, or the like can change variously. The number of SFs included in the frame may change variously according to a channel bandwidth and a cyclic prefix (CP) length.

The SFH can carry an essential system parameter and system configuration information. The SFH may be located in a first subframe of the SF. The SFH can be classified into a primary-SFH (P-SFH) and a secondary-SFH (S-SFH). The P-SFH and the S-SFH may be transmitted in every superframe.

One frame includes 8 subframes SF0, SF1, SF2, SF3, SF4, SF5, SF6, and SF7. Each subframe can be used for uplink or downlink transmission. One subframe includes a plurality of orthogonal frequency division multiplexing (OFDM) symbols in a time domain, and includes a plurality of subcarriers in a frequency domain. An OFDM symbol is for representing one symbol period, and can be referred to as other terminologies such as an OFDM symbol, an SC-FDMA symbol, etc., according to a multiple access scheme. The subframe can consist of 5, 6, 7, or 9 OFDM symbols. However, this is for exemplary purposes only, and thus the number of OFDM symbols included in the subframe is not limited thereto. The number of OFDM symbols included in the subframe may change variously according to a channel bandwidth and a CP length. A subframe type may be defined according to the number of OFDM symbols included in the subframe. For example, it can be defined such that a type-1 subframe includes 6 OFDM symbols, a type-2 subframe includes 7 OFDM symbols, a type-3 subframe includes 5 OFDM symbols, and a type-4 subframe includes 9 OFDM symbols. One frame may include subframes each having the same type. Alternatively, one frame may include subframes each having a different type. That is, the number of OFDM symbols included in each subframe may be identical or different in one frame. Alternatively, the number of OFDM symbols included in at least one subframe of one frame may be different from the number of OFDM symbols of the remaining subframes of the frame.

Time division duplexing (TDD) or frequency division duplexing (FDD) may be applied to the frame. In the TDD, each subframe is used in uplink or downlink transmission at the same frequency and at a different time. That is, subframes included in a TDD frame are divided into an uplink subframe and a downlink subframe in the time domain. In the FDD, each subframe is used in uplink or downlink transmission at the same time and at a different frequency. That is, subframes included in an FDD frame are divided into an uplink subframe and a downlink subframe in the frequency domain. Uplink transmission and downlink transmission occupy different frequency bands and can be simultaneously performed.

A subframe includes a plurality of physical resource units (PRUs) in the frequency domain. The PRU is a basic physical unit for resource allocation, and consists of a plurality of consecutive OFDM symbols in the time domain and a plurality of consecutive subcarriers in the frequency domain. The number of OFDM symbols included in the PRU may be equal to the number of OFDM symbols included in one subframe. Therefore, the number of OFDM symbols in the PRU can be determined according to a subframe type. For example, when one subframe consists of 6 OFDM symbols, the PRU may be defined with 18 subcarriers and 6 OFDM symbols.

A logical resource unit (LRU) is a basic logical unit for distributed resource allocation and contiguous resource allocation. The LRU is defined with a plurality of OFDM symbols and a plurality of subcarriers, and includes pilots used in the PRU. Therefore, a desired number of subcarriers for one LRU depends on the number of allocated pilots.

A distributed resource unit (DRU) may be used to obtain a frequency diversity gain. The DRU includes a distributed subcarrier group in one frequency partition. The DRU has the same size as the PRU. One subcarrier is a basic unit of constituting the DRU. A distributed logical resource unit (DLRU) can be obtained by performing subcarrier permutation on the DRU.

A contiguous resource unit (CRU) may be used to obtain a frequency selective scheduling gain. The CRU includes a localized subcarrier group. The CRU has the same size as the PRU. A contiguous logical resource unit (CLRU) can be obtained by directly mapping the CRU.

Meanwhile, a fractional frequency reuse (FFR) scheme can be used in a cellular system having multiple cells. The FFR scheme splits a full frequency band into a plurality of frequency partitions (FPs), and allocates a part of the FP to each cell. According to the FFR scheme, different FPs can be allocated between neighbor cells, and the same FP can be allocated between cells separated far from one another. Therefore, inter-cell interference (ICI) can be reduced, and performance of a UE located in a cell edge can be increased.

Figure 3:
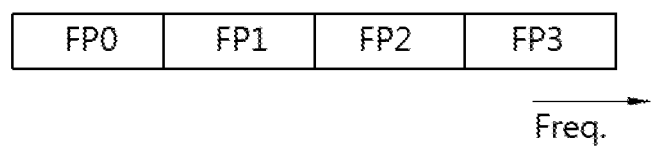
FIG. 3 shows an example of a method of splitting a full frequency band into a plurality of FPs.

FIG. 3 shows an example of a method of splitting a full frequency band into a plurality of FPs.

Referring to FIG. 3, the full frequency band is split into first to fourth FPs (i.e., FP0, FP1, FP2, and FP3). Each FP can be physically or logically split from the full frequency band.

Figure 4:
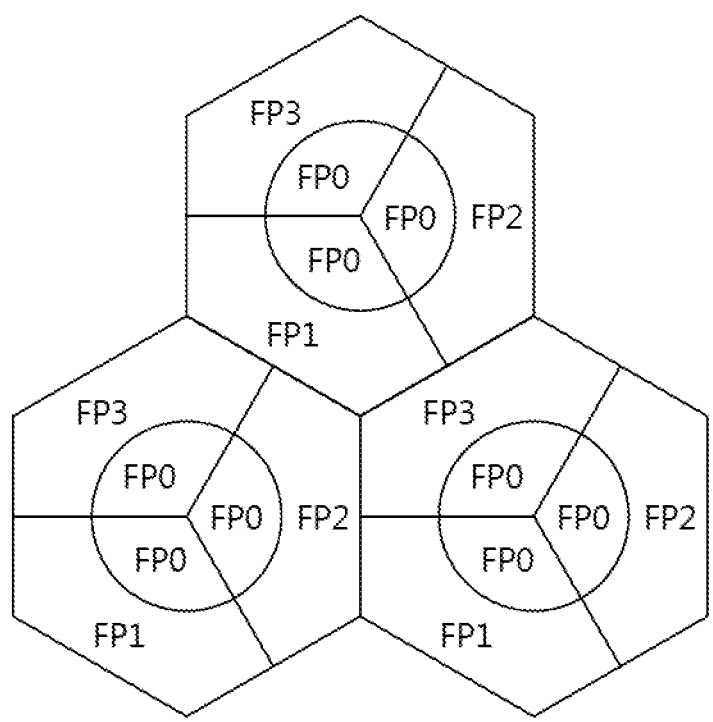
FIG. 4 shows an example of a cellular system using an FFR scheme.

FIG. 4 shows an example of a cellular system using an FFR scheme.

Referring to FIG. 4, each cell is divided into an inner cell and a cell edge. Further, each cell is divided into three sectors. It is assumed that a full frequency band is split into three FPs (i.e., FP1, FP2, and FP3), and a first FP (i.e., FP0) includes second and third FPs (i.e., FP1 and FP2), and a fourth FP (i.e., FP3). That is, the first FP (i.e., FP0) is identical to the full frequency band.

The first FP (i.e., FP0) is allocated in an inner cell. Any one of the second to fourth FPs (i.e., FP1 to FP3) is allocated in each sector of a cell edge. In this case, different FPs are allocated between neighbor cells. Hereinafter, an allocated FP is referred to as an active FP, and an unallocated FP is referred to as an inactive FP. For example, when the second FP (i.e., FP1) is allocated, the second FP is an active FP, and the third to fourth FPs (i.e., FP2 and FP3) are inactive FPs.

A frequency reuse factor (FRF) can be defined according to the number of cells (or sectors) into which the full frequency band can be split. In this case, the FRF may be 1 in an inner cell, and may be 3 in each sector of a cell edge.

Figure 5:
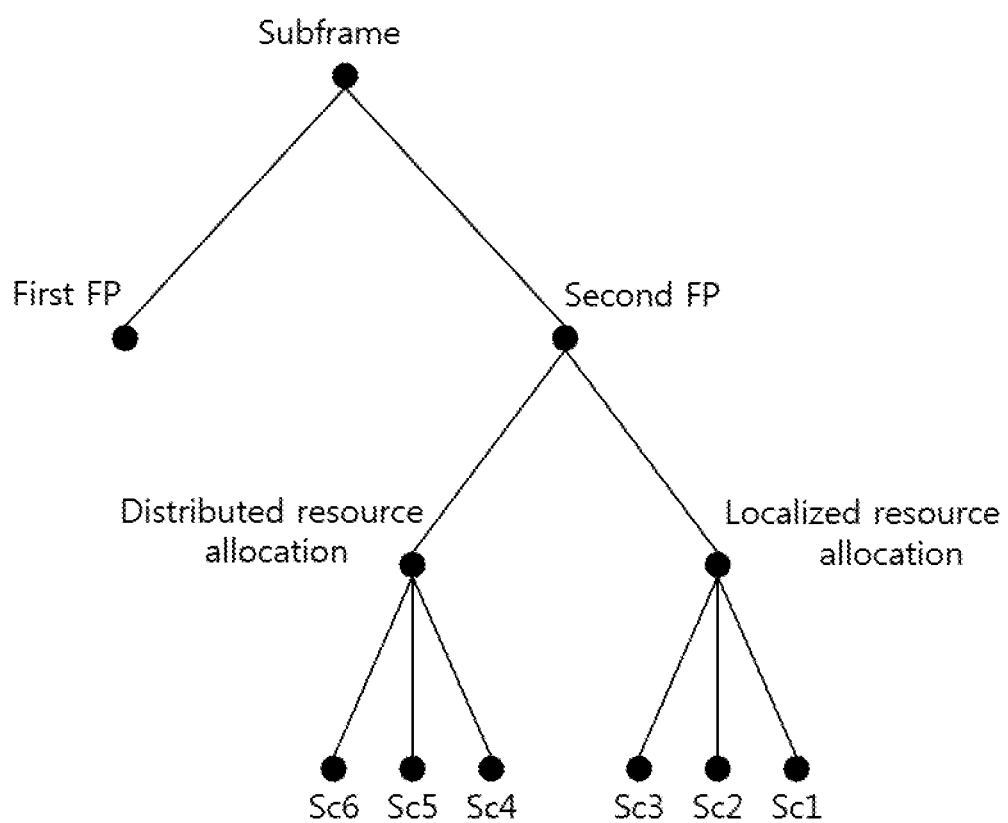
FIG. 5 shows an example of a downlink resource structure.

FIG. 5 shows an example of a downlink resource structure.

Referring to FIG. 5, a downlink subframe can be divided into at least one FP. Herein, the subframe is divided into two FPs (i.e., FP1 and FP2) for example. However, the number of FPs in the subframe is not limited thereto. Each FP can be used for other purposes such as FFR.

Each FP consists of at least one PRU. Each FP may include distributed resource allocation and/or contiguous resource allocation. Herein, the second FP (i.e., FP2) includes the distributed resource allocation and the contiguous resource allocation. 'Sc' denotes a subcarrier.

Meanwhile, a radio resource may be optionally split into several subchannels by performing subchannelization. The subchannel may include a distributed subchannel and a contiguous subchannel. The distributed subchannel may be a DLRU, and the contiguous subchannel may be a CLRU. The subchannelization may allow a subcarrier of a URL to be spread over the full bandwidth.

The subchannelization is applied by considering the following aspects.

Figure 6:
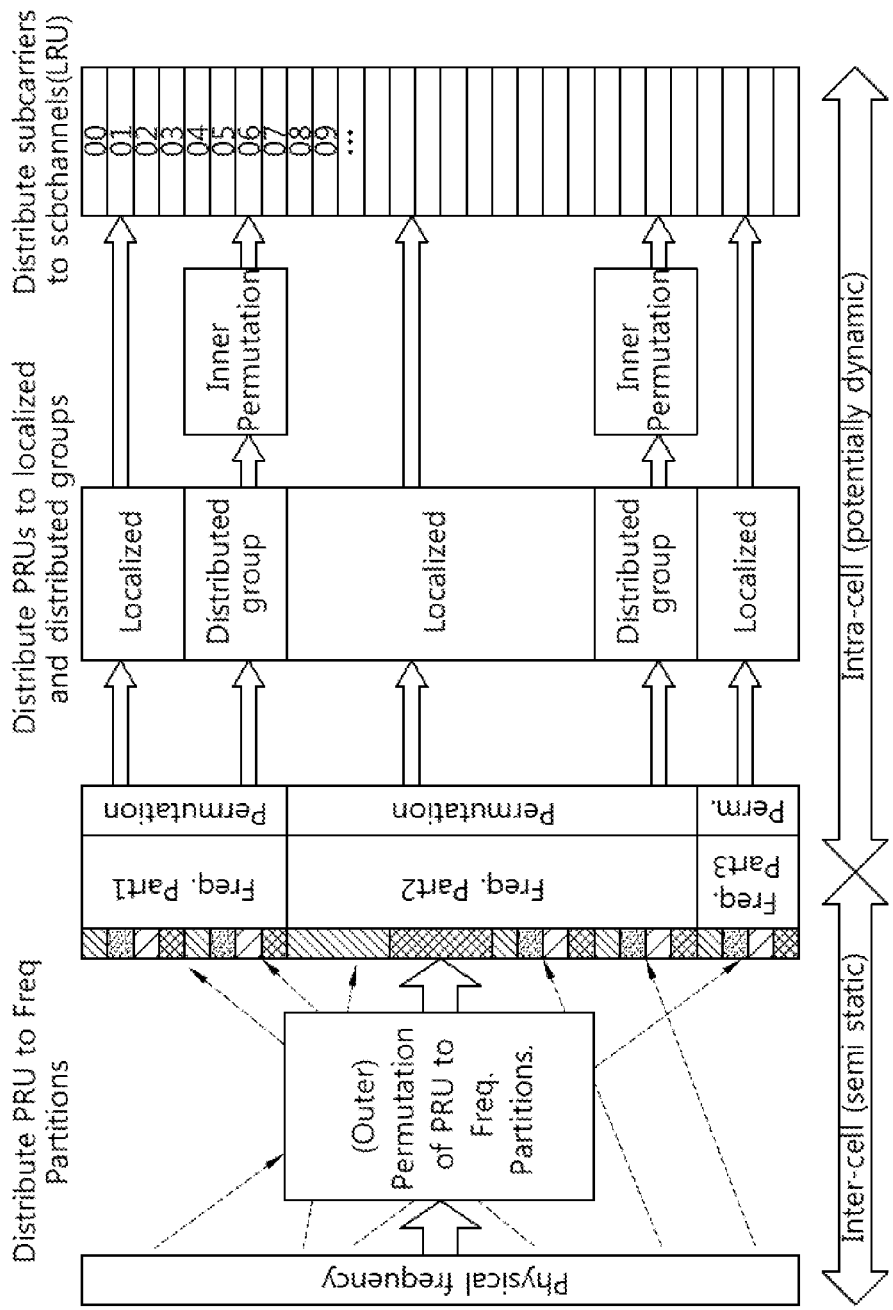
FIG. 6 shows an example of a subchannelization process.

1) Performance of both DLRU and CLRU
2) Reduced assignment signaling overhead and channel quality indicator (CQI) feedback overhead
3) Flexibility in the ratio between distributed resource and localized resources
4) Easy to scale according to bandwidth
5) Feasible and simple to design allocation sequences
6) Flexible and relevant to FFR configuration FIG. 6 shows an example of a subchannelization process. Referring to FIG. 6, subchannelization is performed according to the following procedure.

1) Outer permutation is performed on a PRU. The outer permutation implies mapping of the PRU to each PF. The outer permutation is applied in a granularity of at least one PRU. The outer permutation can be performed in a granularity of $N_1$ or $N_2$ PRUs (where $N_1 > N_2$). In this case, $N_1$ or $N_2$ can vary depending on a bandwidth. However, the outer permutation is effectively achieved when $N_1$ is an integer multiple of $N_2$. The output permutation may imply a process including steps of: dividing a PRU into a subband (SB) PRU (hereinafter, $PRU_{SB}$) and a miniband (MB) PRU (hereinafter, $PRU_{MB}$) similarly to SB partitioning; and performing permutation on the $PRU_{MB}$ in a PRU granularity similarly to MB permutation. The $PRU_{SB}$ is a PRU to be allocated to an SB, and the $PRU_{MB}$ is a PRU to be allocated to an MB. Since the SB uses contiguous PRUs in a frequency domain, the SB is suitable for frequency selective allocation, and the MB is suitable for frequency diversity allocation.

$K_{SB}$ may be defined as the number of SBs having a granularity of $N_1$ in an entire radio resource. When considering the FFR, information on the $K_{SB}$ needs to have the same value between cells. In this case, the information on the $K_{SB}$ may be shared between the cells by using signaling, or may be predetermined according to a bandwidth. In addition, the outer permutation can be performed in such a manner that radio resources are allocated equally for each cell when considering the FFR whereas the radio resources are allocated differently for each cell when not considering the FFR. The information on the $K_{SB}$ may be broadcast from a BS to a UE. When being broadcast, the information can be transmitted using a broadcast channel (BCH) or a super frame header (SFH).

2) A rearranged PRU is distributed to one or more FPs. This step may be included in the "1) outer permutation" and thus be omitted, or may be performed using FP information which is broadcast. One FP may include a granularity of $N_1$ and a granularity of $N_2$, and a reuse region may have the same meaning as the FP. Alternatively, one FP may include only one granularity, and each reuse region may include a plurality of FPs having different granularities of $N_1$ and $N_2$.

3) An FP is divided into a CRU and a DRU for each resource. The division can be achieved in a granularity of $N_1$ or $N_2$. That is, if each FP includes one granularity, the division can be achieved for each FP, and if each FP includes different granularities, the division can be achieved in each granularity. In addition, sector-specific permutation can be supported, and direct resource mapping can be supported for contiguous resources. A size of distributed/contiguous resources can be set flexibly for each sector.

4) A contiguous group and a distributed group are mapped to an LRU.

Inner permutation (or subcarrier permutation) defined for distributed resource allocation in one FP enables spreading of subcarriers for a distributed resource unit in all distributed resources. The inner permutation can be performed based on a subcarrier or a tile. A granularity of the inner permutation is identical to a basic unit of constituting a distributed resource unit. Subchannelization for distributed resources enables spreading of subcarriers for the LRU of the all distributed resources.

There is no inner permutation for contiguous resource allocation. A PRU is directly mapped to a contiguous resource unit in each FP.

Meanwhile, an IEEE 802.16m system may consider not only a single carrier but also multiple carriers. According to a UE, only one carrier may be accessed or several carriers may be accessed. When supporting multiple carriers, a guard band may be allocated to decrease interference between carriers.

Figure 7:
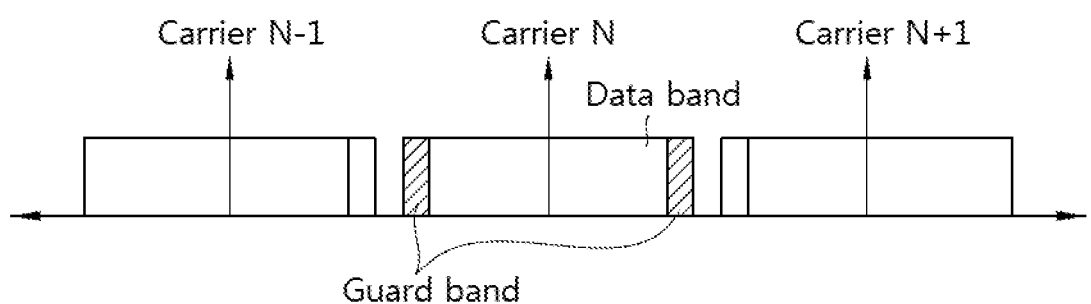
FIG. 7 shows an example of a frequency domain in a multiple-carrier system.

FIG. 7 shows an example of a frequency domain in a multiple-carrier system.

Referring to FIG. 7, a plurality of carriers are adjacent to each other in the frequency domain. The frequency domain of the carriers may be divided into a data band for data transmission and a guard band for avoiding interference between one data to another. The data band includes a plurality of data subcarriers, and the guard band includes a plurality of guard subcarriers. In addition, the carrier may include a DC subcarrier. The data band may be split into a plurality of frequency partitions by the use of FFR. Various methods can be used when the data band is split into the frequency partitions. That is, a group of adjacent subcarriers may be allocated to one frequency partition, and subcarriers may be selected according to a specific interval or a specific rule and the selected subcarriers may be combined in a specific size and then be allocated to one frequency partition. Alternatively, one frequency partition may be configured by using a method of selecting and combining subcarriers according to a specific rule in a divided zone after splitting the resource zone by combining adjacent subcarriers.

Meanwhile, for effective resource utilization, the guard band may be used as a resource for data transmission. In order to use the guard band in data transmission, there is a need to determine whether a BS and a UE have capability for supporting data transmission of the guard band.

Figure 8:
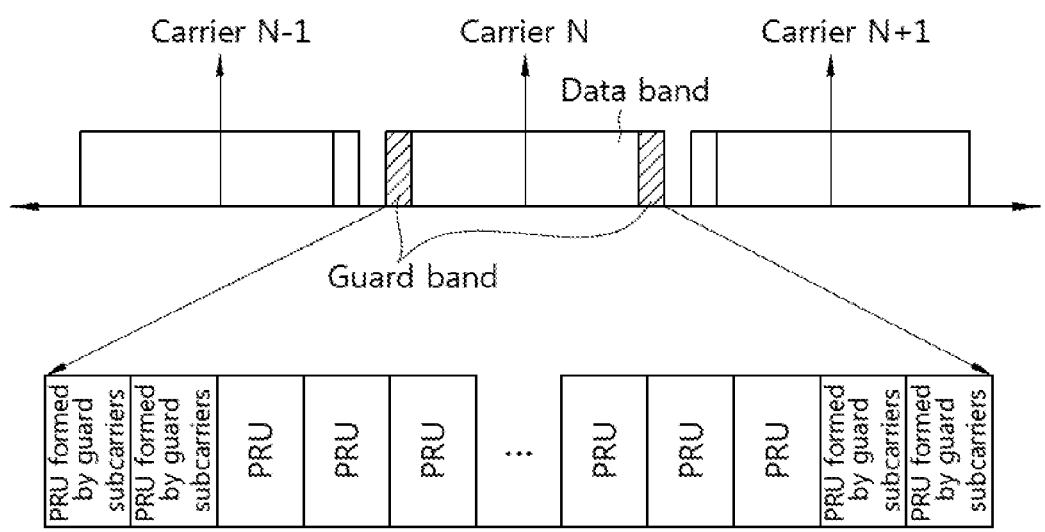
FIG. 8 shows an example of a frequency domain in which a guard band is used in data transmission in a multiple-carrier system.

FIG. 8 shows an example of a frequency domain in which a guard band is used in data transmission in a multiple-carrier system.

Referring to FIG. 8, the frequency domain of carriers may be divided into a data band for data transmission and a guard band for avoiding interference between one data to another. The data band and the guard band consist of a PRU including a plurality of subcarriers. The guard band may be used for data transmission. At least one PRU is allocated to the guard band consisting of a plurality of guard subcarriers. The number of PRUs may be predetermined, and must be known to a BS and a UE according to a carrier bandwidth. Hereinafter, the frequency domain consisting of the guard band used in data transmission and an original data band is called a total data region. Therefore, a plurality of PRUs are allocated to the total data region. The plurality of PRUs constituting the total data region can form a CRU through a permutation and subchannelization process. In addition, the BS needs to provide the UE with information on the use of a guard resource.

Table 1 shows an example of the number of PRUs that can be allocated to the guard band according to the carrier bandwidth.

TABLE 1

| | 5 MHz | 10 MHz | 20 MHz | 7 MHz | 8.75 MHz |
|---|---|---|---|---|---|
| Left edge PRU | 0 | 1 | 2 | 0 | 0 |
| Right edge PRU | 0 | 1 | 2 | 0 | 0 |

Referring to Table 1, when the carrier bandwidth is 10 MHz, one guard PRU is allocated to each of both sides of the data band of the carrier, and when the carrier bandwidth is 20 MHz, two guard PRUs are allocated to each of both sides of the data band of the carrier. A left guard PRU is not allocated to a carrier located to the left edge of the frequency domain, and a right guard PRU is not allocated to a carrier located to the right edge of the frequency domain.

When the guard band is used for data transmission as described above, the guard band also needs to be subjected to a subchannelization process. However, the subchannelization process of the guard band preferably does not have an effect on the subchannelization process of the data band in the conventional single-carrier system in terms of system efficiency. In addition, among UEs, there is a UE that can use the guard band in data transmission or reception or a UE that cannot use the guard band in data transmission or reception. Therefore, an effective subchannelization process or data transmission method is required by considering the aforementioned several aspects.

In the general subchannelization process, a radio resource is divided into a $PRU_{SB}$ and a $PRU_{MB}$. The $PRU_{SB}$ consists of $K_{SB}$ subbands, and the $PRU_{MB}$ consists of $K_{MB}$ minibands. The $PRU_{MB}$ may be permutated one more time to configure a $PPRU_{MB}$. The subband constituting the $PRU_{SB}$ and the miniband constituting the $PRU_{MB}$ may be allocated to one or more FPs. One FP is allocated basically, and the maximum number of FPs may be 4. Herein, an $i^{th}$ FP is expressed by FPi. The remaining FPs other than FP0 may include the same number of PRUs. The $PRU_{FPi}$ is mapped to an LRU, and mapping from the $PRU_{FPi}$ to the LRU is performed only within a corresponding FPi.

Hereinafter, the proposed data transmission method will be described according to an embodiment of the present invention. First, a case where a guard band is used only for a CRU will be described. The data transmission method proposed in the present invention can be applied variously according to in which step the guard band is allocated for data transmission among various steps constituting a subchannelization process of a radio resource exemplified in FIG. 6.

Meanwhile, it is assumed in the multiple-carrier system that a carrier includes a 1st guard band, a data band, and a 2nd guard band in a frequency domain. The 1st guard band may have a higher frequency than the data band, and the 2nd guard band may have a lower frequency than the data band. Alternatively, the 1st guard band may have a lower frequency than the data band, and the 2nd guard band may have a higher frequency than the data band.

Figure 9:
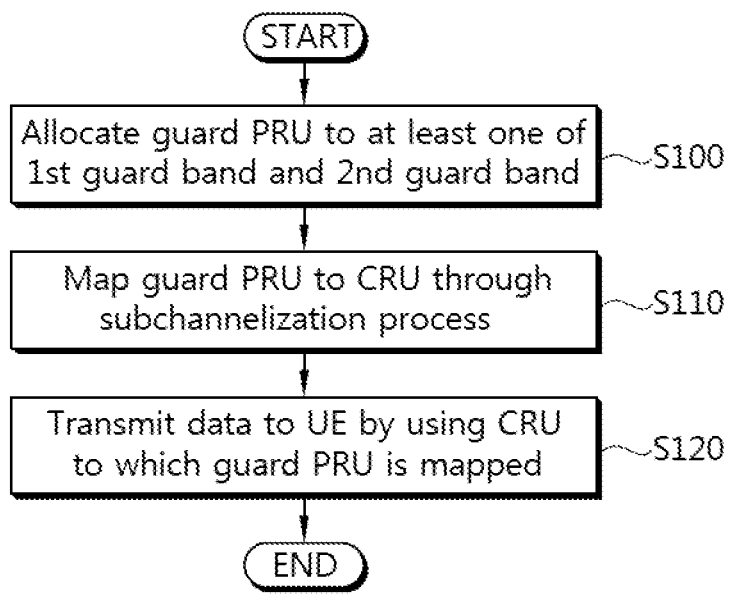
FIG. 9 shows an example of the proposed data transmission method.

FIG. 9 shows an example of the proposed data transmission method. In the present embodiment, a guard band is included in a total data region in a first step of subchannelization before a plurality of PRUs are divided into a $PRU_{SB}$ and a $PRU_{MB}$. That is, this is a case where the guard band is included in the total data region before the first process of FIG. 6.

In step S100, a transmitter allocates at least one guard PRU including a plurality of contiguous subcarriers to at least any one of a 1st guard band and a 2nd guard band.

In step S110, the transmitter maps the guard PRU to a CRU through a subchannelization process.

The CRU may be a localized subchannel. The subchannelization process is performed on the total data region including a data band and the guard PRU. The subchannelization process includes subband partitioning which divides the PRU into a $PRU_{SB}$ and a $PRU_{MB}$. In the subband partitioning, the PRU may be divided into a plurality of PRU sets including $N_1$ contiguous PRUs. Herein, $N_1$ may be 4. According to whether the PRU set includes the guard PRU, a detailed operation of the subchannelization process may vary.

1) The PRU set may be allocated to a $PRU_{SB}$ when at least one PRU set includes the data band PRU and the guard PRU. The $PRU_{SB}$ may be mapped to a CRU through the subchannelization process.

2) If there is no PRU set including both the data band PRU and the guard PRU, the guard PRU may be allocated to a $PRU_{MB}$. The $PRU_{MB}$ may be mapped to a CRU through the subchannelization process.

3) If at least one PRU set includes only $N_1$ guard PRUs, the PRU set may be mapped to a CRU by being allocated to a subband, or may be subjected to additional permutation by being allocated to a miniband.

In general, the case 2) or 3) is advantageous over the case 1) in a sense that the conventional subchannelization process is directly maintained and the guard PRU can be relatively freely allocated to the CRU.

In step S120, the transmitter transmits data to a UE by using the CRU to which the guard PRU is mapped.

The UE receiving the data by using the CRU to which the guard PRU is mapped must be a UE that can use the guard band in data reception. A UE that cannot use the guard band in data reception receives data by using a PRU based on the data band. If the BS can know whether each UE can use the guard band in data transmission in a process in which the UE access to the BS, the CRU to which the guard PRU is mapped can be allocated by using scheduling.

Figure 10:
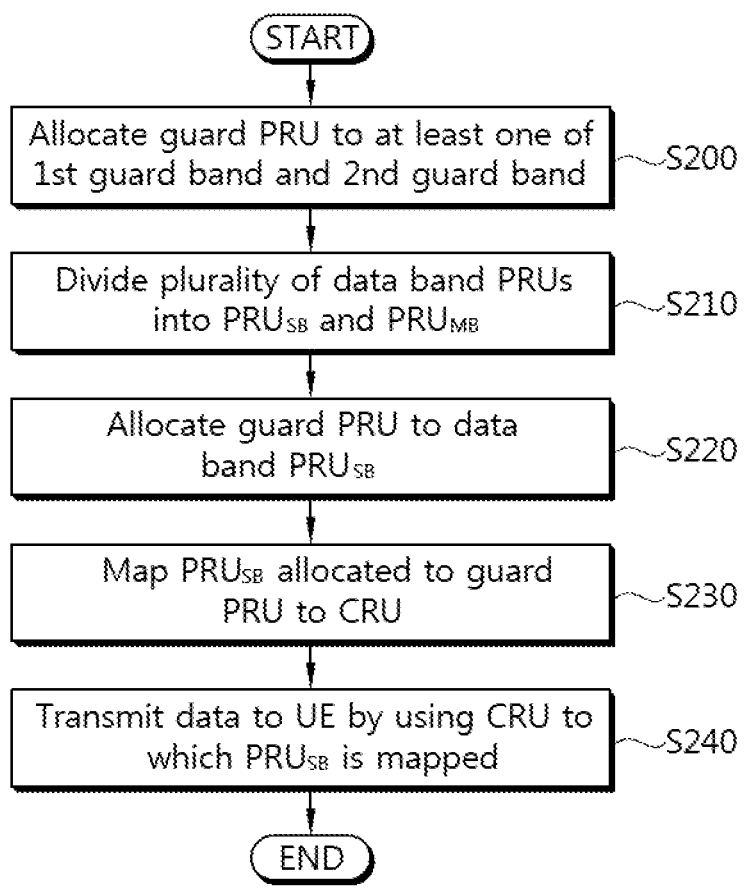
FIG. 10 shows another example of the proposed data transmission method.

FIG. 10 shows another example of the proposed data transmission method. In the present embodiment, a guard band is allocated to a $PRU_{SB}$ after a plurality of data band PRUs is divided into a $PRU_{SB}$ and a $PRU_{MB}$. That is, this is a case where the guard band is included in a total data region in the first process of FIG. 6.

In step S200, a transmitter allocates at least one guard PRU including a plurality of contiguous subcarriers to at least any one of a 1st guard band and a 2nd guard band. In step S210, the transmitter divides the plurality of data band PRUs into a $PRU_{SB}$ and a $PRU_{MB}$.

In step S220, the transmitter allocates the guard PRU to the data band $PRU_{SB}$.

The data band $PRU_{SB}$ may consist of a plurality of PRU sets including $N_1$ contiguous PRUs. The guard PRU may also consist of one PRU set with $N_1$ granularity. If the guard PRU cannot be configured with $N_1$ granularity, an index of the guard PRU is preferably separated from an index of the data band $PRU_{SB}$. This is because the subchannelization process for a UE that cannot use the guard band in data transmission may become complex if the guard PRU uses the same index as the data band $PRU_{SB}$. Meanwhile, information on the guard PRU may be broadcast through a broadcast channel (BCH) to a UE that can use the guard PRU in data transmission.

In step S230, the transmitter maps the $PRU_{SB}$, to which the guard PRU is allocated, to a CRU. In step S240, the transmitter transmits data to the UE by using the CRU to which the $PRU_{SB}$ is mapped.

Figure 11:
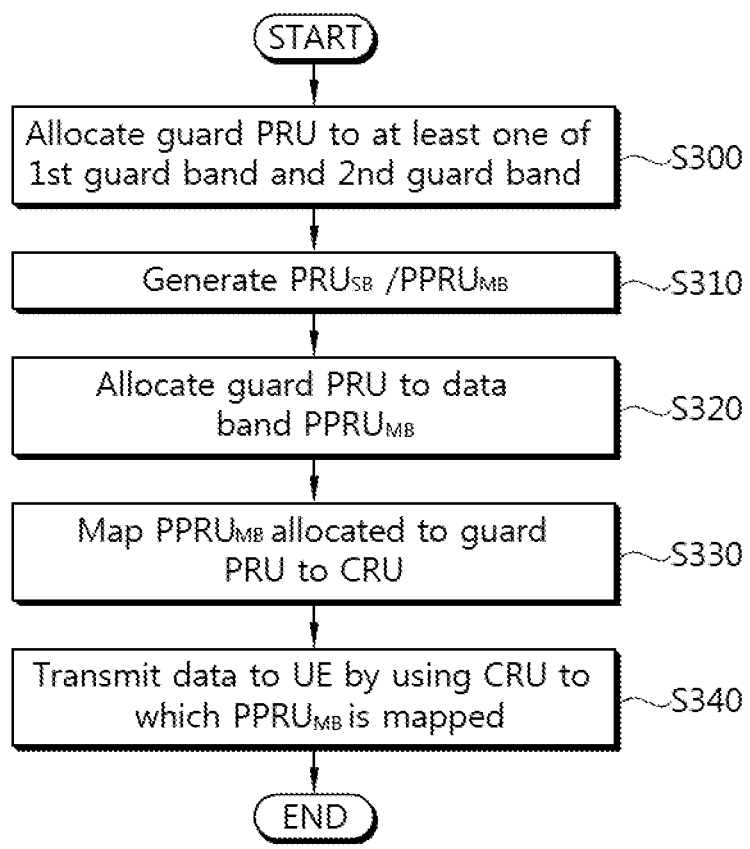
FIG. 11 shows another embodiment of the proposed data transmission method.

FIG. 11 shows another embodiment of the proposed data transmission method. In the present embodiment, a guard band is allocated to a $PPRU_{MB}$ generated by performing permutation on a $PRU_{MB}$ after a plurality of data band PRUs are divided into a $PRU_{SB}$ and a $PRU_{MB}$. That is, this is a case where the guard band is included in a total data region in the first process of FIG. 6.

In step S300, a transmitter allocates at least one guard PRU including a plurality of contiguous subcarriers to at least any one of a 1st guard band and a 2nd guard band. In step S310, the transmitter divides the plurality of data band PRUs into a $PRU_{SB}$ and a $PRU_{MB}$, and generates a $PPRU_{MB}$ by performing permutation on the $PRU_{MB}$.

In step S320, the transmitter allocates the guard PRU to the data band $PRU_{MB}$.

The guard PRU may be allocated to the $PPRU_{MB}$ with $N_2$ granularity. In this case, $N_2$ may be 1. If $N_2=1$, a granularity problem does not occur when indexing the guard PRU. Therefore, when indexing the guard PRU, indexing may be performed subsequently to an index of the data band $PPRU_{MB}$.

In step S330, the transmitter maps the $PPRU_{MB}$ allocated to the guard PRU to a CRU. In step S340, the transmitter transmits data to a UE by using the CRU to which the $PPRU_{MB}$ is mapped.

Figure 12:
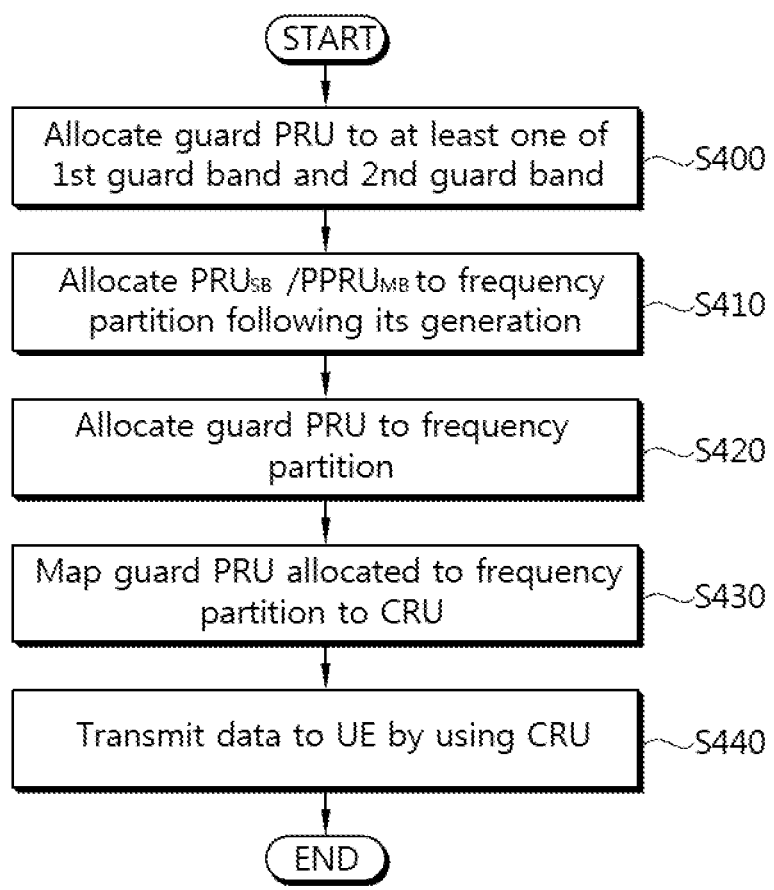
FIG. 12 shows another embodiment of the proposed data transmission method.

FIG. 12 shows another embodiment of the proposed data transmission method. In the present embodiment, a guard band is allocated after a plurality of data band PRUs is divided into at least one of more frequency partitions by using a $PRU_{SB}$ and a $PRU_{MB}$ (or $PPRU_{MB}$). That is, this is a case where the guard band is included in a total data region in the third process of FIG. 6.

In step S400, a transmitter allocates at least one guard PRU including a plurality of contiguous subcarriers to at least any one of a 1st guard band and a 2nd guard band. In step S410, the transmitter divides the plurality of data band PRUs into a $PRU_{SB}$ and a $PRU_{MB}$, and generates a $PPRU_{MB}$ by performing permutation on the $PRU_{MB}$. The $PRU_{SB}$ and the $PPRU_{MB}$ are allocated to at least one frequency partition.

In step S420, the transmitter allocates the guard PRU to the at least one frequency partition.

The guard PRU may be allocated to at least one frequency partition with $N_2$ granularity. Herein, $N_2$ may be 1. In addition, when allocating the guard PRU to the at least one frequency partition, it may be allocated only to a specific frequency partition such as a reuse-1 region. Information on the guard PRU may be broadcast through a BCH or the like to a UE that can use the guard PRU in data transmission.

In step S430, the transmitter maps the guard PRU allocated to the at least one frequency partition to a CRU.

The CRU may consist of a subband CRU based on the $PRU_{SB}$ and a miniband CRU based on the $PRU_{MB}$ (or $PPRU_{MB}$). The CRU to which the guard PRU is mapped may be mapped contiguously to the miniband CRU. That is, an index of the miniband CRU may be followed by an index of the CRU to which the guard PRU is mapped. Alternatively, the index of the CRU to which the guard PRU is mapped may be indexed subsequently to an index of CRUs belonging to the frequency partition.

In step S440, the transmitter transmits data to the UE by using the CRU.

Figure 13:
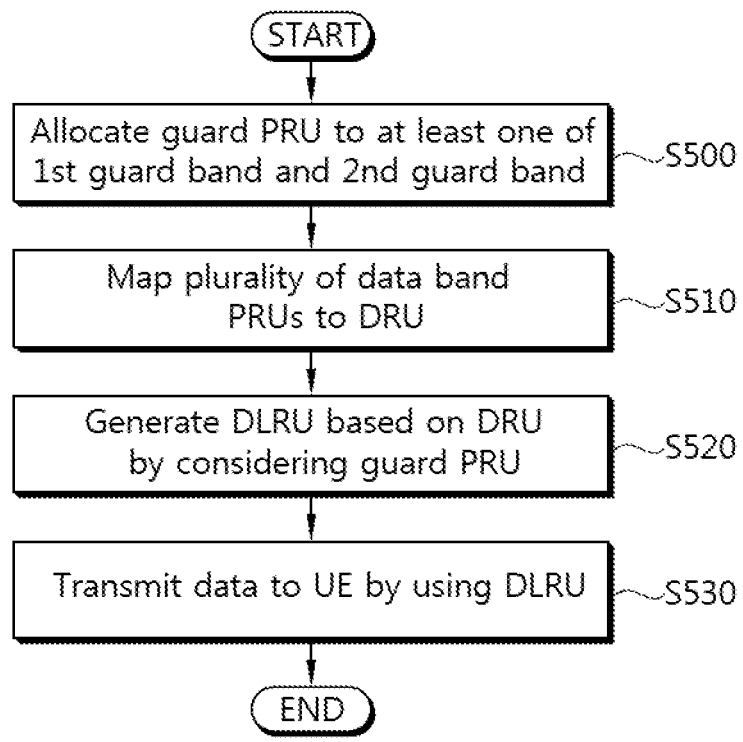
FIG. 13 shows another embodiment of the proposed data transmission method.

FIG. 13 shows another embodiment of the proposed data transmission method. In the present embodiment, after a plurality of data band PRUs are allocated to a CRU and a DRU, a guard band is allocated when subcarrier permutation is performed on the DRU. That is, this is a case where the guard band is included in a total data region in the fourth process of FIG. 6.

In step S500, a transmitter allocates at least one guard PRU including a plurality of contiguous subcarriers to at least any one of a 1st guard band and a 2nd guard band. In step S510, the transmitter splits a plurality of data band PRUs into at least one frequency partition, and maps the frequency partition to the DRU. In step S520, the transmitter generates a DLRU by performing subcarrier permutation on the DRU by considering the guard PRU.

In step S530, the transmitter transmits data to a UE by using the DLRU.

Meanwhile, various methods may be applied when indexing a CRU to which the guard PRU is mapped and allocating this to the UE. It is assumed hereinafter that the guard PRU is allocated after a data band PRU is split into at least one frequency partition and is then mapped to a subband CRU and a miniband CRU. That is, the embodiment of FIG. 12 is applied among various embodiments of the proposed data transmission method.

Figure 14:
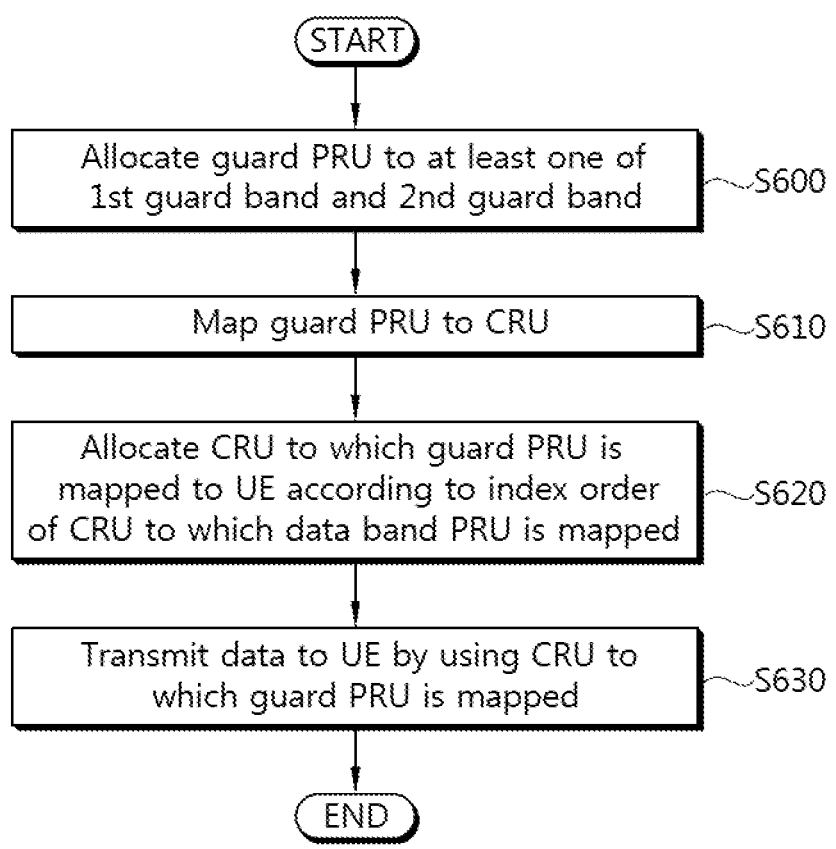
FIG. 14 shows another embodiment of the proposed data transmission method.

FIG. 14 shows another embodiment of the proposed data transmission method.

In step S600, a transmitter allocates at least one guard PRU including a plurality of contiguous subcarriers to each of a 1st guard band and a 2nd guard band. n1 PRUs are allocated to the 1st guard band, and n2 PRUs are allocated to the 2nd guard band.

In step S610, the transmitter maps the guard PRU to a CRU. The CRU may be mapped contiguously to the CRU to which the data band PRU is mapped. The CRU to which the data band PRU is mapped may be divided into a subband CRU and a miniband CRU. The guard PRU may be mapped contiguously to the miniband CRU. That is, an index of the CRU to which the guard PRU is mapped is contiguous to an index of the miniband CRU. If a DRU is indexed contiguously to the index of the miniband CRU before the guard PRU is mapped to the CRU, an index of the DRU is moved back by the index of the CRU to which the guard PRU is mapped.

When the CRU to which the guard PRU is mapped is indexed contiguously to the index of the miniband CRU, a CRU to which the guard PRU of the 1st guard band is mapped may be indexed first, and then the CRU to which the guard PRU of the 2nd guard band is mapped may be indexed. Alternatively, the CRU to which the guard PRU of the 2nd guard band is mapped may be indexed first, and then the CRU of the 1st guard band to which the guard PRU is mapped may be indexed.

Alternatively, the CRU to which the guard PRU of the 1st guard band is mapped and the CRU to which the guard PRU of the 2nd guard band is mapped may be indexed in turn. For example, subsequent to the index of the miniband CRU, a CRU to which a 1st PRU of the 1st guard band is mapped, a CRU to which a 1st PRU of the 2nd guard band is mapped, a CRU to which a 2nd PRU of the 1st guard band is mapped, and a CRU to which a 2nd PRU of the 2nd guard band is mapped may be indexed in that order. This may imply that the PRU of the 1st guard band and the PRU of the 2nd guard band are paired and then mapped to the CRU. If n1=n2, there are n1 or n2 PRU pairs, and each PRU pair may consist of one 1st guard band PRU and one 2nd guard band PRU. If n1=0, there are n2 PRU pairs, and each PRU pair may consist of one 2nd guard band PRU. If n1>n2, n2 PRU pairs may consist of one 1st guard band PRU and one 2nd guard band PRU, and (n1−n2) PRU pairs may consist of one 1st guard band PRU. By mapping PRUs of different frequency bands in turn to the CRU as described above, a frequency diversity gain can be obtained.

When indexing is performed on the CRU in turn as described above, it can be expressed by equations as follows. If SGMB denotes the number of available guard PRUs in one carrier, the guard PRU of the 1st guard band can be expressed by PRU1[0], ..., PRU1[SGMB/2−1], and the guard PRU of the 2nd guard band can be expressed by PRU2[0], PRU2

[SGMB/2-1]. The PRU1 of the 1st guard band and the PRU2 of the 2nd guard band may be indexed from a PRU to which a low frequency is allocated. In the PRU1 of the 1st guard band and the PRU2 of the 2nd guard band, PRUs can be re-arranged in turn in a cross manner. If the re-arranged guard PRU is referred to as a GPRU, an index of the GPRU can be expressed by Equation 1.

$$GPRU[i]=PRU1[i/2], \text{ for even } i$$

$$GPRU[i]=PRU2[(i-1)/2], \text{ for odd } i \quad \text{[Equation 1]}$$

The GPRU is directly mapped to the CRU without permutation.

In step S620, the transmitter allocates the CRU to which the guard PRU is mapped to a UE according to an index order of the CRU to which the data band PRU is mapped. The allocation of step S620 and the indexing of step S610 may be combined into one operation. That is, after mapping the guard PRU to the CRU, the CRU may be autonomously indexed according to an index of the miniband CRU and may be allocated to the UE. The CRU to which the guard PRU is mapped may be allocated together when the miniband CRU is allocated to the UE, When allocating the CRU to which the guard PRU is mapped, the CRU to which the entirety of the guard PRU is mapped may be autonomously allocated to the UE together with a specific miniband CRU. The specific miniband CRU may be a miniband CRU having the greatest index (i.e., the last miniband CRU) or having the smallest index (i.e., the first miniband CRU).

Alternatively, as described in step S610, when the guard PRU of the 1st guard band and the guard PRU of the 2nd guard band are mapped in turn to the CRU by forming a PRU pair, a CRU to which the PRU pair is mapped may be autonomously mapped to the UE together with the specific miniband CRU. The number of PRU pairs may be 2, and in this case, the PRU pair may be allocated together when the two CRUs having the greatest indices are allocated to the UE in the miniband CRU. Alternatively, in the miniband CRU, a CRU having the smallest index and a CRU having the greatest CRU may be allocated together.

Figure 15:
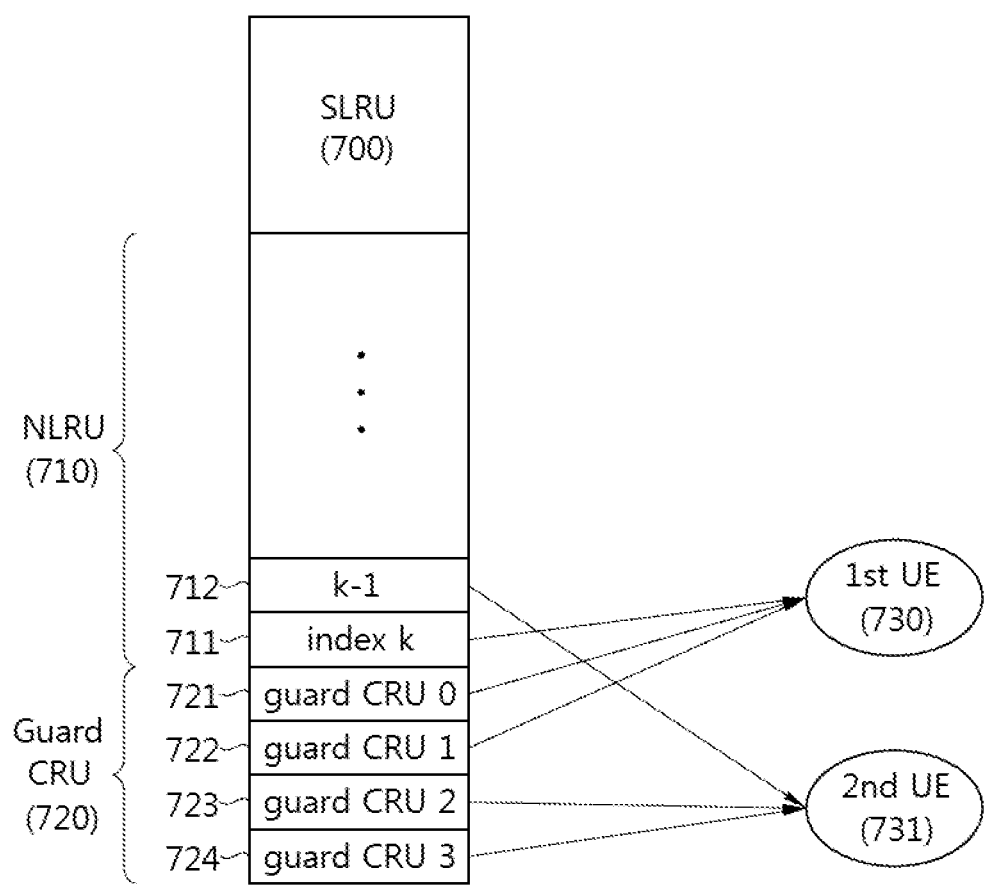
FIG. 15 shows an example of a guard PRU pair allocated to each of two miniband CRUs when a guard PRU is mapped to a CRU by forming a PRU pair.

FIG. 15 shows an example of a guard PRU pair allocated to each of two miniband CRUs when a guard PRU is mapped to a CRU by forming a PRU pair.

Referring to FIG. 15, the CRU includes a subband LRU (SLRU) 700, a miniband LRU (NLRU) 710, and a guard CRU 720. A CRU 711 (indexed with k) having the greatest index in the NLRU 710 is allocated to a 1st UE 730 together with a CRU 721 to which a 1st PRU of a 1st guard band is mapped and a CRU 722 to which a 1st PRU of a 2nd guard band is mapped in the guard CRU 720. A CRU 712 (indexed with k-1) having a second greatest index in the NLRU 710 is allocated to a 2nd UE 740 together with a CRU 723 to which a 2nd PRU of a 1st guard band is mapped and a CRU 724 to which a 2nd PRU of a 2nd guard band is mapped in the guard CRU 720.

Alternatively, even if the guard PRU of the 1st guard band and the guard PRU of the 2nd guard band are mapped in turn to the CRU by forming a PRU pair, each the guard PRU may be autonomously allocated in turn together with the miniband CRU. Alternatively, it can also be interpreted as that the guard PRUs of the 1st guard band and the 2nd guard band are mapped in turn to the CRU, and when they are allocated to the UE, the mapped guard PRUs are allocated in turn one by one. If the total number of guard PRUs is 4, when four CRUs having the greatest index in the miniband CRU are allocated to the UE, the CRU to which the guard PRU is mapped may be allocated together in turn one by one.

Figure 16:
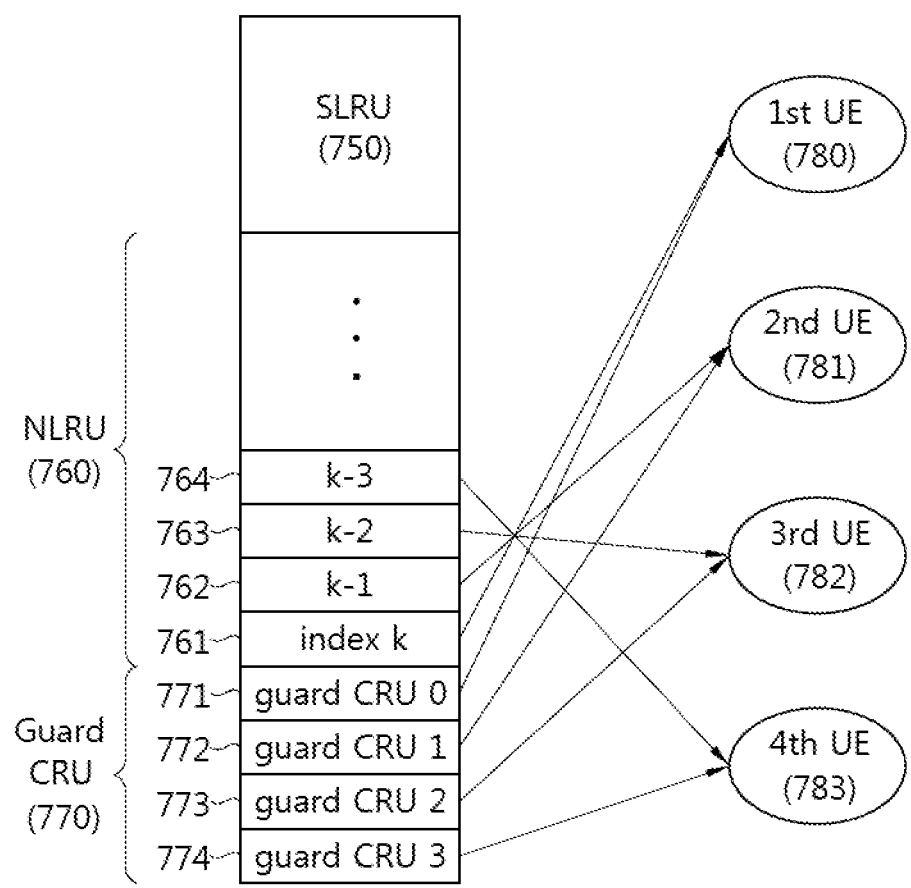
FIG. 16 shows an example in which a guard PRU is allocated to each of four miniband CRUs when the guard PRU is mapped to a CRU by forming a PRU pair or when the guard PRU is mapped to a CRU in turn in two guard bands.

FIG. 16 shows an example in which a guard PRU is allocated to each of four miniband CRUs when the guard PRU is mapped to a CRU by forming a PRU pair or when the guard PRU is mapped to a CRU in turn in two guard bands.

Referring to FIG. 16, a CRU includes an SLRU 750, an NLRU 760, and a guard CRU 770. A CRU 761 (indexed with k) having the greatest index in the NLRU 760 is allocated to a 1st UE 780 together with a CRU 771 to which a 1st PRU of a 1st guard band is mapped in the guard CRU 770. A CRU 762 (indexed with k-1) having a second greatest index in the NLRU 760 is allocated to a 2nd UE 781 together with a CRU 772 to which a 1st PRU of a 2nd guard band is mapped in the guard CRU 770. A CRU 763 (indexed with k-2) having a third greatest index in the NLRU 760 is allocated to a 3rd UE 782 together with a CRU 773 to which a 2nd PRU of a 1st guard band is mapped in the guard CRU 770. A CRU 764 (indexed with k-3) having a fourth greatest index in the NLRU 760 is allocated to a 4th UE 783 together with a CRU 774 to which a 2nd PRU of a 2nd guard band is mapped in the guard CRU 770.

Alternatively, n1 guard PRUs of the 1st guard band may be allocated when n1 CRUs having a smallest index are allocated to the UE in a miniband CRU, and n2 guard PRUs of the 2nd guard band may be allocated when n2 CRUs having a greatest index are allocated to the UE in a miniband CRU. Alternatively, the n1 guard PRUs of the 1st guard band may be allocated together with a CRU having a smallest index in a miniband CRU, and n2 guard PRUs of the 2nd guard band may be allocated together with a CRU having a greatest index in a miniband CRU.

Referring back to FIG. 14, in step S630, the transmitter transmits data to the UE by using the CRU to which the guard PRU is mapped.

Hereinafter, a case where the guard band is used only for a DRU will be described. When the guard band including a plurality of guard PRUs is used for the DRU, a frequency diversity gain can be obtained.

Even if the guard band is allocated only for the DRU, various methods can be used for allocation according to in which step of the subchannelization process the guard PRU will be allocated, similarly to a case of allocating the guard band only for the CRU.

1) The guard PRU can be subjected to subchannelization together with the data band PRU. That is, the guard PRU may be allocated between one step and another in the subchannelization process for the data band. Examples of the step include subband partitioning, miniband permutation, frequency partitioning, CRU/DRU allocation, etc. Since the miniband is allocated in a PRU granularity in general, there is no need to consider granularity similarly to the case of allocating the aforementioned guard PRU to the CRU. Therefore, the guard PRU can be allocated freely in each step of the subchannelization process.

Figure 17:
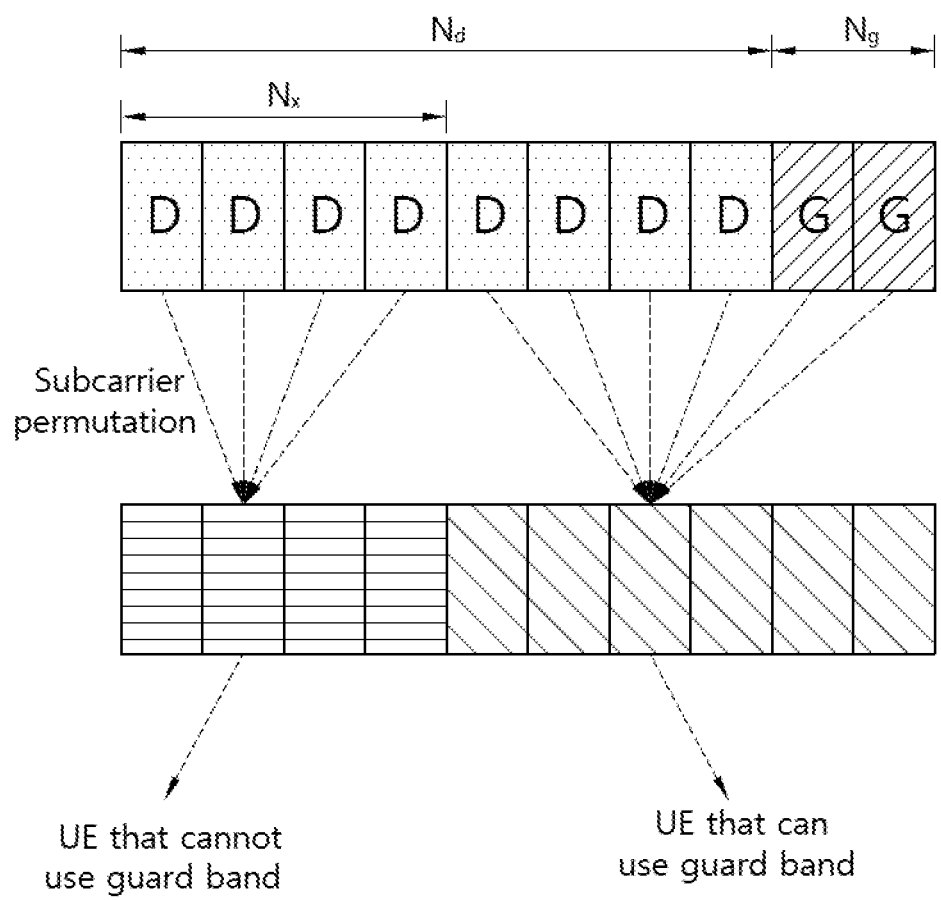
FIG. 17 shows an example of a case where a guard PRU is allocated to a DRU.

FIG. 17 shows an example of a case where a guard PRU is allocated to a DRU.

Referring to FIG. 17, $N_d$ data band PRUs and $N_g$ guard PRUs are allocated in one frequency partition. In the data band PRU, $N_x(N_x \leq N_d)$ PRUs are subjected to subcarrier permutation to form a distributed subchannel. In the data band PRU, $(N_d - N_x)$ PRUs may also be subjected to subcarrier permutation to form a distributed subchannel. That is, the $N_x$ data band PRUs and the $(N_d - N_x)$ data band PRUs independently form a distributed subchannel in the subcarrier permutation process. The $(N_d - N_x)$ PRUs may form a distributed subchannel together with the guard PRU and thus may allocate the distributed subchannel to a UE that can use the guard PRU.

Figure 18:
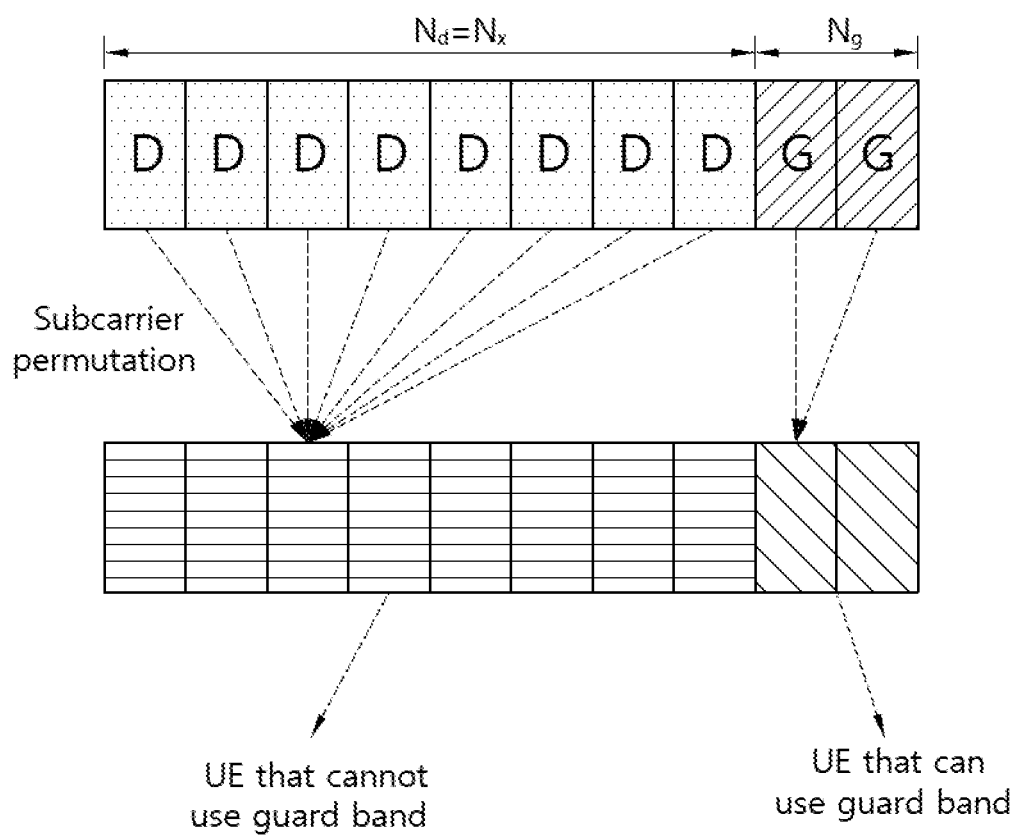
FIG. 18 shows another example of a case where a guard PRU is allocated to a DRU.

FIG. 18 shows another example of a case where a guard PRU is allocated to a DRU.

Referring to FIG. 18, $N_d$ data band PRUs and $N_g$ guard PRUs are allocated in one frequency partition. The data band PRU and the guard PRU separately form a distributed subchannel. That is, in this case, $N_x=N_d$. The $N_d$ data band PRUs are subjected to subcarrier permutation to form a distributed subchannel, and the distributed subchannel is allocated to a UE that cannot use the guard band. The $N_g$ guard PRUs are subjected to subcarrier permutation to form a distributed subchannel, and the distributed subchannel is allocated to a UE that can use the guard band.

Figure 19:
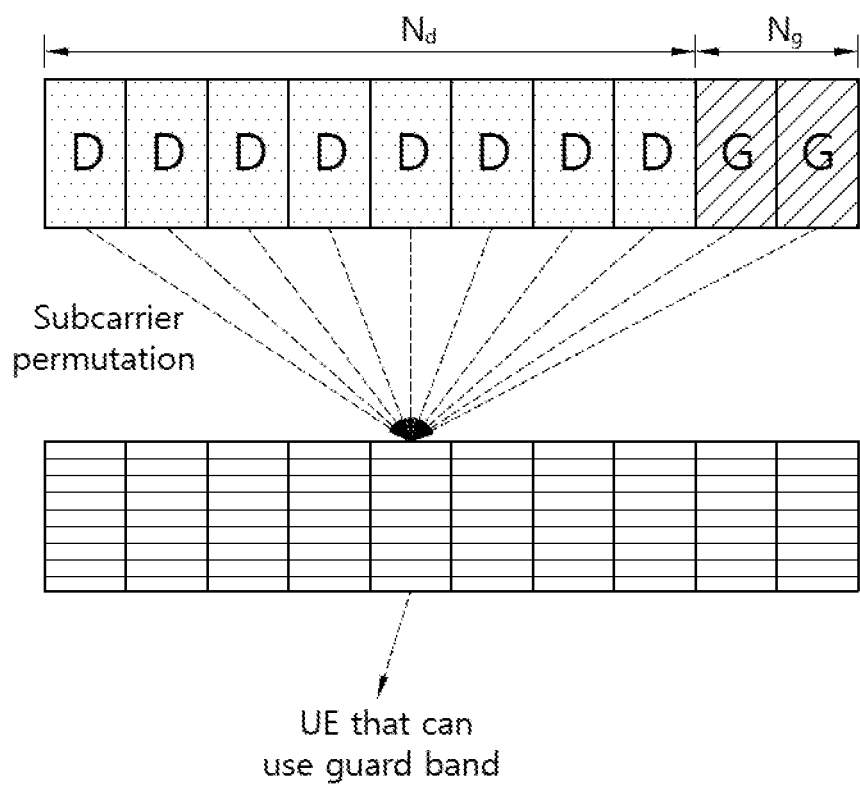
FIG. 19 shows another example of a case where a guard PRU is allocated to a DRU.

FIG. 19 shows another example of a case where a guard PRU is allocated to a DRU.

Referring to FIG. 19, $N_d$ data band PRUs and $N_g$ guard PRUs are allocated in one frequency partition. The data band PRU and the guard PRU form a distributed subchannel without distinction. That is, this is a case where $N_x=0$. $(N_d+N_g)$ distributed subchannels are formed through subcarrier permutation. In this case, since each distributed subchannel may include a guard PRU, all UEs must be able to use the guard band, and all UEs that use at least the distributed subchannel must be able to use the guard band.

Figure 20:
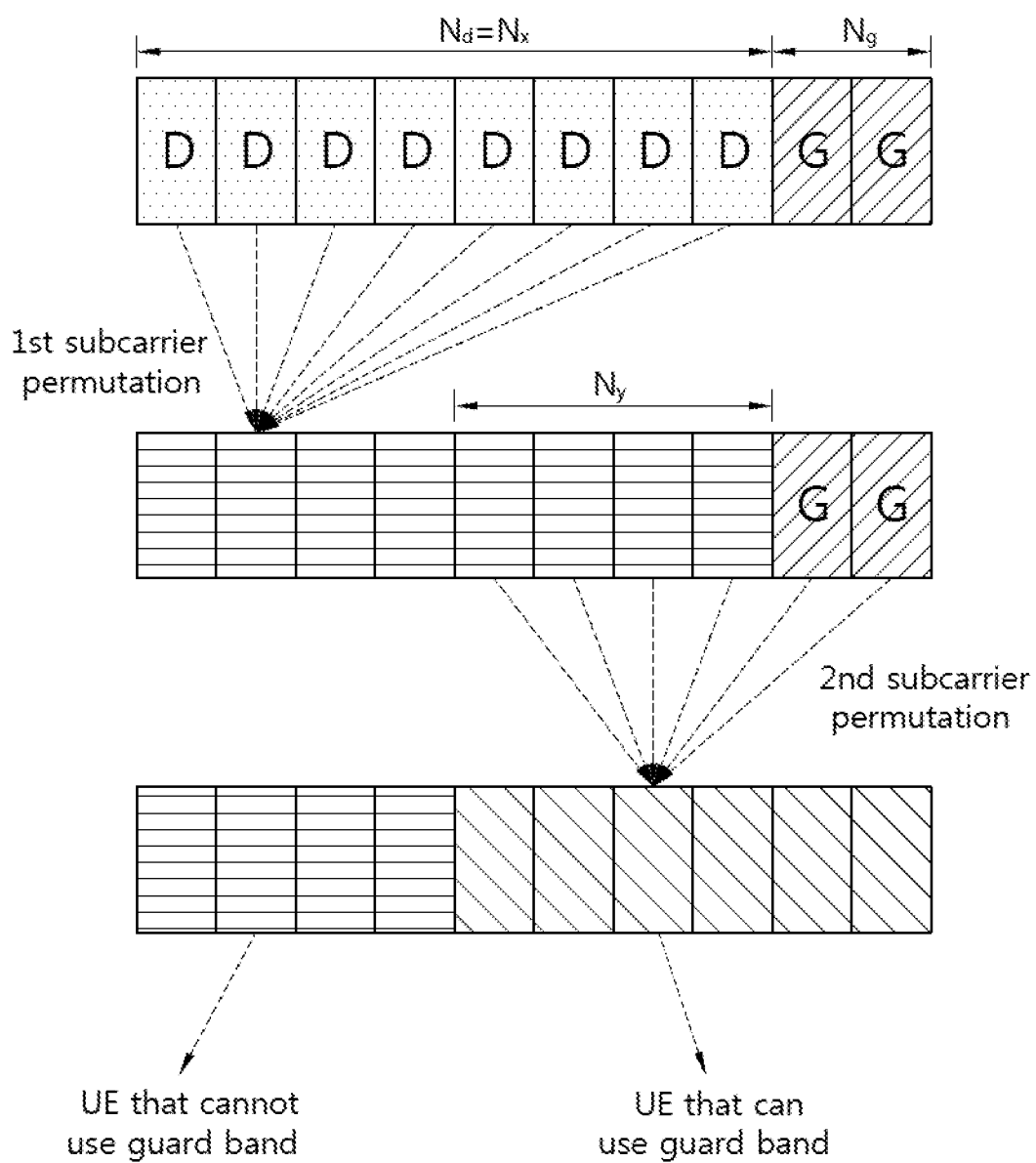
FIG. 20 shows another example of a case where a guard PRU is allocated to a DRU.

FIG. 20 shows another example of a case where a guard PRU is allocated to a DRU.

Referring to FIG. 20, $N_d$ data band PRUs and $N_g$ guard PRUs are allocated in one frequency partition. First, first subcarrier permutation is performed for the data band PRU. In the data band PRU subjected to the first subcarrier permutation, second subcarrier permutation is performed by combining $N_y(N_y<N_d)$ distributed subchannels and the guard PRU to form a distributed subchannel. Therefore, the $N_y$ distributed subchannel and $(N_d-N_y)$ distribution subchannels independently form a distribution subchannel. The $(N_y+N_g)$ distributed subchannels subjected to the second subcarrier permutation must be allocated to a UE that can use a guard band.

2) The guard PRU may be allocated after the data band PRU is subjected to subchannelization. That is, after the data band PRU is subjected to subcarrier permutation, the distributed subchannel is formed and then the guard PRU can be allocated.

The distributed subchannel can be divided into a tone-based DRU and a PRU-based DRU. The tone-based DRU is a subcarrier-based DRU, and is distributed in a subcarrier granularity in the distributed subchannel. Since the guard PRU is subjected to subchannelization with a PRU granularity, the guard PRU must be subjected to subchannelization together from the beginning in order to form the tone-based DRU. The PRU-based DRU is distributed in a PRU granularity in the distributed subchannel. Therefore, the PRU-based DRU can be used even if a plurality of PRUs are simply allocated to a UE without performing additional subcarrier permutation. In addition, unlike the tone-based DRU, the additional subcarrier permutation is not required.

Figure 21:
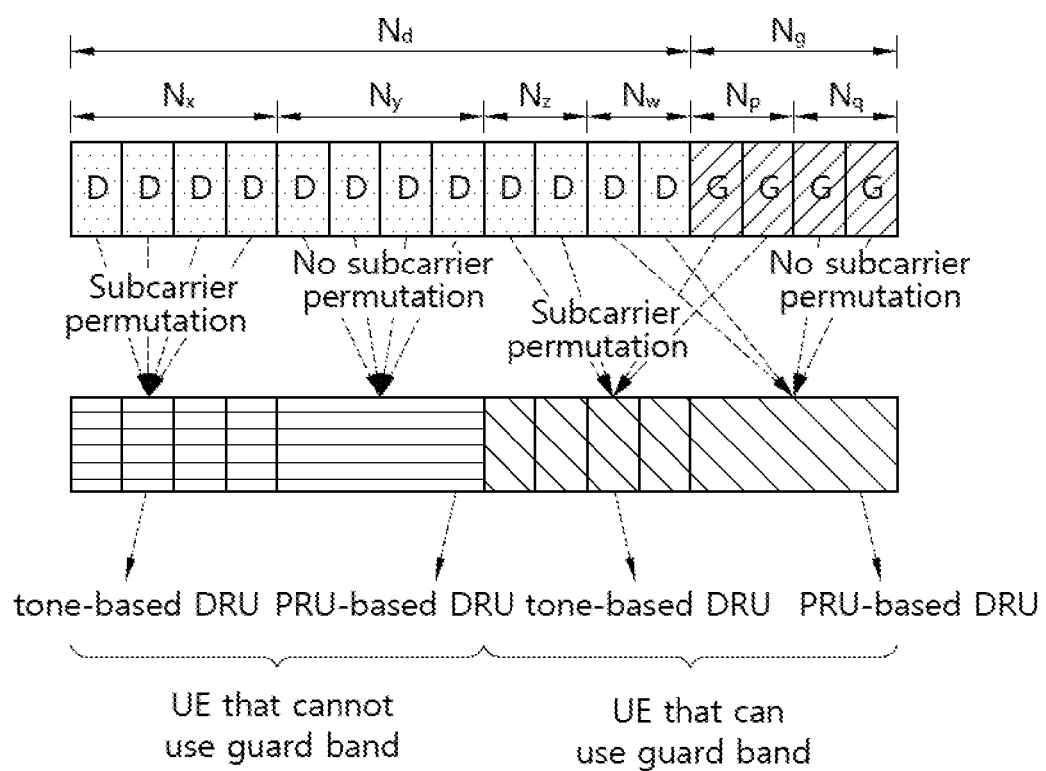
FIG. 21 shows another example of a case where a guard PRU is allocated to a DRU.

FIG. 21 shows another example of a case where a guard PRU is allocated to a DRU. This is a case where a tone-based DRU and a PRU-based DRU are simultaneously formed in one frequency partition.

Referring to FIG. 21, $N_d$ data band PRUs and $N_g$ guard PRUs are allocated in one frequency partition. $N_x(N_x<N_d)$ data band PRUs are subjected to subcarrier permutation to form a tone-based DRU. $N_y(N_y<N_d)$ data band PRUs form the PRU-based DRU without the subcarrier permutation. Since the $N_x$ and $N_y$ DRUs are formed on the basis of the data-based PRU, they can be allocated to UEs that cannot use the guard band. Meanwhile, $N_z(N_z<N_d)$ data band PRUs and $N_p(N_p<N_g)$ guard PRUs are subjected to subcarrier permutation to form a tone-based DRU. In addition, $N_w(N_w<N_d)$ data band PRUs and $N_q(N_q<N_g)$ guard PRUs form a PRU-based DRU without subcarrier permutation. Since a guard PRU is included in the $(N_z+N_p)$ and $(N_w+N_q)$ DRUs, they can be allocated to UEs that can use the guard band. That is, PRUs to be allocated to the tone-based DRU and the PRU-based DRU may be selected in advance to perform subchannelization independently.

Meanwhile, when forming a distributed subchannel by using the guard PRU, the distribution subchannel may be formed only for the guard PRU allocated to one carrier, or the distributed subchannel may be formed by gathering guard PRUs allocated to a plurality of carriers. When using only one guard PRU allocated to one carrier, the number of guard PRUs is not great, and thus it may be difficult to obtain a frequency diversity gain. When guard PRUs allocated to a plurality of carriers are gathered to be used, the frequency diversity gain can be easily obtained, but complexity of the subchannelization is increased. Therefore, there is a need to consider multicarrier grouping in which a plurality of carriers are divided into a plurality of groups and subchannelization is performed in a corresponding group. Information on the multi-carrier grouping or information on the use of the guard PRU in a corresponding group may be broadcast from a BS to a UE.

The guard band may be allocated simultaneously to the CRU and the DRU. When the guard band is allocated to the CRU, the exemplary case of the proposed data transmission method described in FIG. 9 to FIG. 14 may be applied, and when the guard band is allocated to the DRU, the exemplary case of FIG. 15 to FIG. 21 in which the guard PRU is allocated to the DRU may be applied. The guard PRU may be subjected to subchannelization together with the data band PRU from the beginning. When there are N carriers, subchannelization may be performed on each of the N carriers by including the guard PRU, and may be performed by including all guard PRUs of the N carriers. In addition, in order to decrease an overhead when performing subchannelization, the subchannelization may be performed by grouping guard PRUs existing between two carriers. Alternatively, the guard PRUs may be allocated and subchannelized while performing a subchannelization process on the data bad PRU. In this case, information indicating a specific frequency partition to which the guard PRU will be allocated needs to be broadcast from the BS to the UE.

Figure 22:
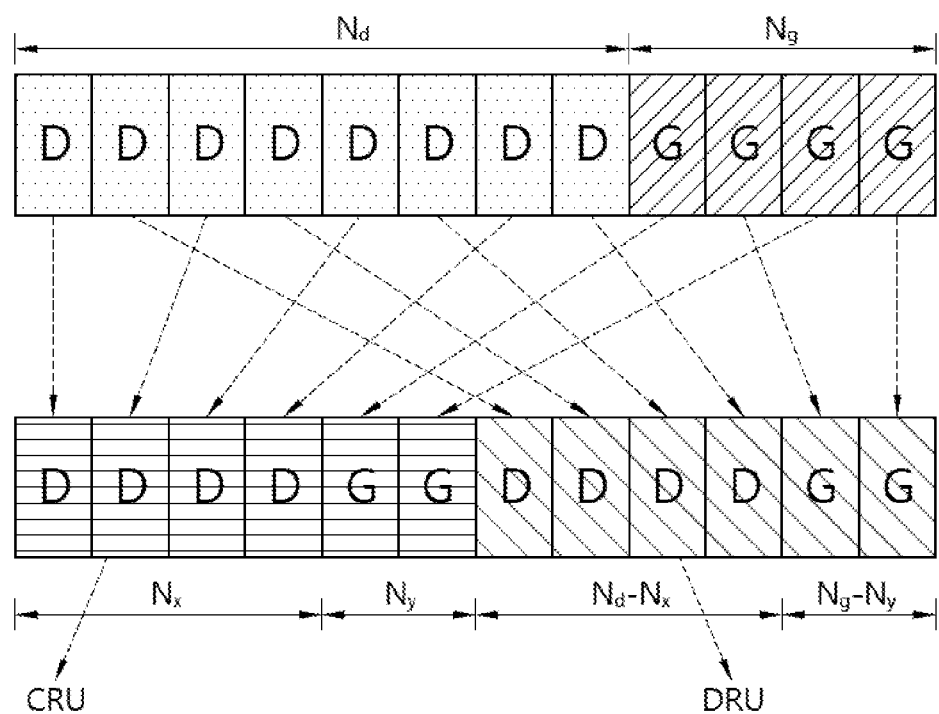
FIG. 22 shows an example of a case where a guard PRU is simultaneously allocated to a CRU and a DRU.

FIG. 22 shows an example of a case where a guard PRU is simultaneously allocated to a CRU and a DRU.

Referring to FIG. 22, Nd data band PRUs and Ng guard PRUs are allocated in one frequency partition. In the data band PRU, Nx(Nx<Nd) data band PRUs and Ny(Ny<Ng) guard PRUs are allocated for a CRU. (Nd−Nx) data band PRUs and (Ng−Ny) guard PRUs are allocated for a DRU.

Figure 23:
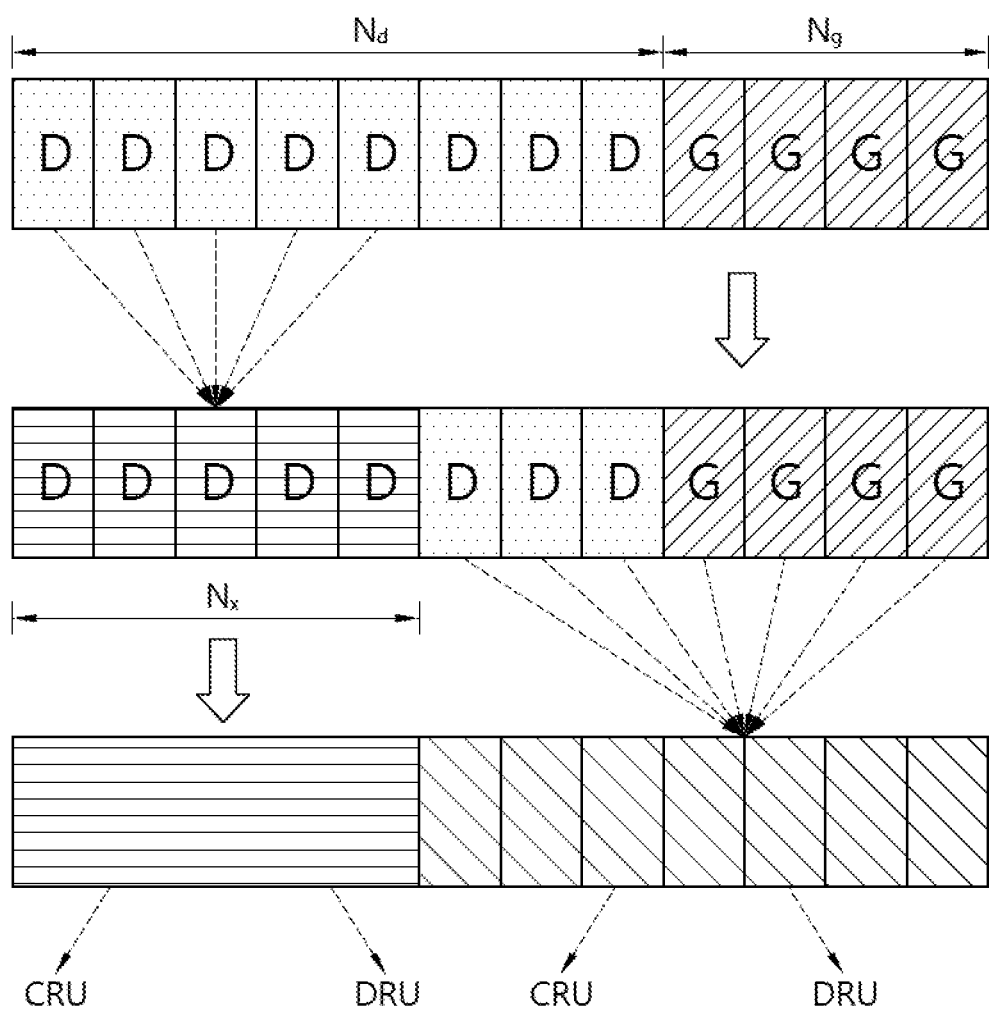
FIG. 23 shows another example of a case where a guard PRU is simultaneously allocated to a CRU and a DRU.

FIG. 23 shows another example of a case where a guard PRU is simultaneously allocated to a CRU and a DRU.

Referring to FIG. 23, Nd data band PRUs and Ng guard PRUs are allocated in one frequency partition. In a data band PRU, subchannelization is performed on Nx(Nx<Nd) PRUs, and the Nx PRUs are allocated to a CRU and a DRU. In addition, subchannelization is performed on (Nd−Nx) data band PRUs and Ng guard PRUs, and the (Nd−Nx+Ng) PRUs are allocated to the CRU and the DRU. If Nd=Nx, the data band PRU and the guard PRU perform subchannelization independently.

Figure 24:
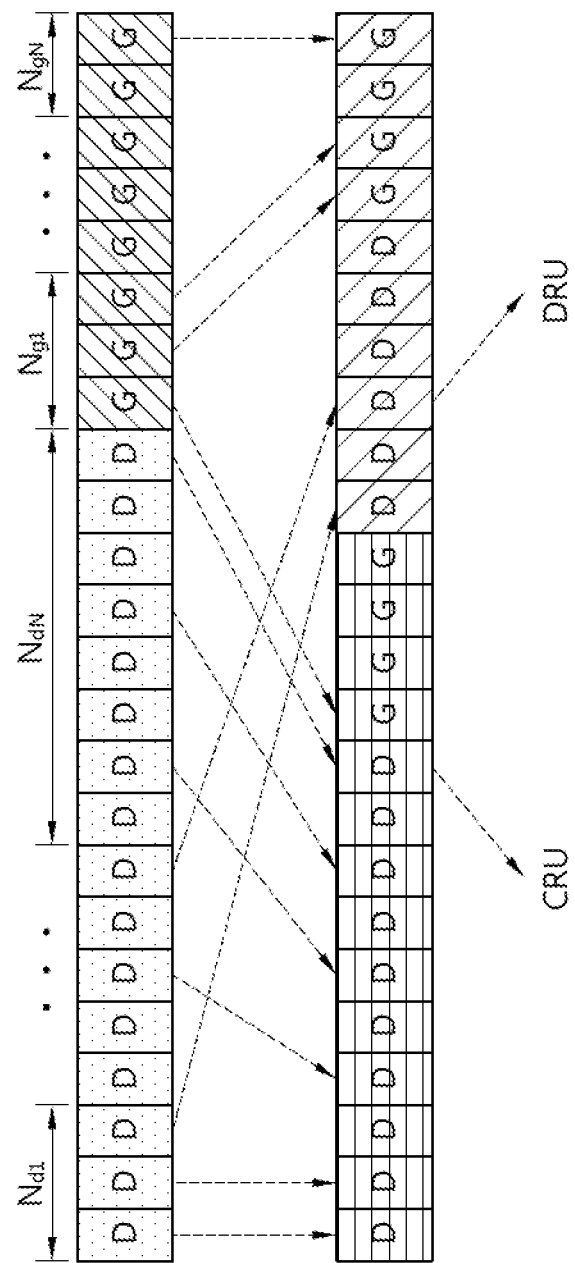
FIG. 24 shows another example of a case where a guard PRU is simultaneously allocated to a CRU and a DRU.

FIG. 24 shows another example of a case where a guard PRU is simultaneously allocated to a CRU and a DRU. In this case, the example of FIG. 22 or FIG. 23 is extended to multiple carriers.

Referring to FIG. 24, a total of Nd data band PRUs and a total of Ng guard PRUs are present. It can be expressed by Nd=$N_{d1}$+$N_{d2}$+ . . . +$N_{dN}$. $N_{dx}$ denotes the number of data band PRUs in an $x^{th}$ carrier, and N denotes the total number of carriers. It can be expressed by Ng=$N_{g1}$+$N_{g12}$+$N_{g23}$+ . . . +$N_{g(N-1)N}$+$N_{gN}$. $N_{gxy}$ denotes the number of guard PRUs existing between an $x^{th}$ carrier and a $y^{th}$ carrier. $N_{g1}$ and $N_{gN}$ denote the number of guard PRUs of first and last carriers existing in the outer edge of a frequency domain. Some of the Nd data band PRUs may be selected and allocated to the CRU. PRUs remaining after being allocated to the CRU and the Ng guard PRUs may be allocated together to the DRU.

Figure 25:
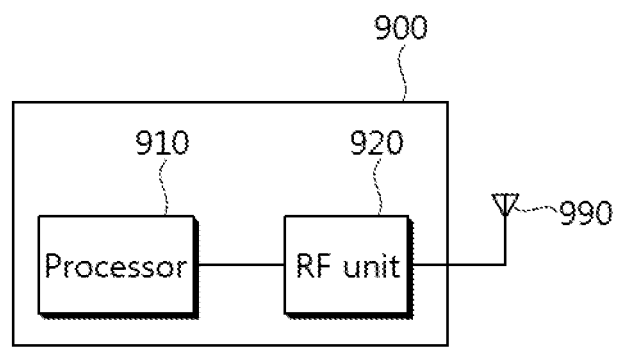
FIG. 25 is a block diagram showing an example of a transmitter for implementing an embodiment of the present invention.

FIG. 25 is a block diagram showing an example of a transmitter for implementing an embodiment of the present invention.

A transmitter 900 includes a processor 910 and a radio frequency (RF) unit 920. The processor 910 implements the proposed functions, procedures, and/or methods.

The processor 910 is configured for allocating at least one guard PRU including a plurality of contiguous subcarriers to at least one of a 1st guard band and a 2nd guard band on a frequency domain, for mapping the guard PRU to a CRU, and for transmitting data by using the CRU to which the guard PRU is mapped, and is characterized in that the CRU to which the guard PRU is mapped is mapped to a CLRU. The RF unit 920 is coupled to the processor 910, and transmits and/or receives a radio signal.

The processor 910 may include an application-specific integrated circuit (ASIC), a separate chipset, a logic circuit, and/or a data processing unit. The RF unit 920 may include a base-band circuit for processing a radio signal. When the embodiment of the present invention is implemented in software, the aforementioned methods can be implemented with a module (i.e., process, function, etc.) for performing the aforementioned functions. The module may be performed by the processor 910.

Although a series of steps or blocks of a flowchart are described in a particular order when performing methods in the aforementioned exemplary system, the steps of the present invention are not limited thereto. Thus, some of these steps may be performed in a different order or may be concurrently performed. Those skilled in the art will understand that these steps of the flowchart are not exclusive, and that another step can be included therein or one or more steps can be omitted without having an effect on the scope of the present invention.

The aforementioned embodiments include various exemplary aspects. Although all possible combinations for representing the various aspects cannot be described, it will be understood by those skilled in the art that other combinations are also possible. Therefore, all replacements, modifications, and changes should fall within the spirit and scope of the claims of the present invention.

What is claimed is:

1. A method of transmitting data in a multiple-carrier system, the multiple-carrier system including a carrier including a first guard band, a data band, and a second guard band in ascending order of frequency, the method comprising:
    mapping guard physical resource units (PRUs) in the first guard band and the second guard band to guard miniband logical resource units (NLRUs) in a frequency partition, the guard PRUs being indexed in such a manner that a first guard PRU in the first guard band and a second guard PRU in the second guard band are indexed in turn; and
    transmitting data through the guard NLRUs to a user equipment,
    wherein the guard PRUs are indexed by the equation as follows:

$$GPRU[i]=PRU1[i/2], \text{ for even } i$$

$$GPRU[i]=PRU2[(i-1)/2], \text{ for odd } i,$$

where GRPU[i] is a re-arranged guard PRU, "i" is an index number, PRU1 is the first guard PRU in the first guard band, and PRU2 is the second guard PRU in the second guard band.

2. The method of claim 1, wherein the frequency partition is a reuse-1 region among a plurality of frequency partitions.

3. The method of claim 1, wherein each of the guard PRUs consists of 18 physically contiguous subcarriers.

4. The method of claim 1, further comprising mapping data PRUs in the data band to data NLRUs in the frequency partition.

5. The method of claim 4, wherein the guard NLRUs and the data NLRUs are allocated together to the user equipment.

6. The method of claim 4, wherein the guard NLRUs are allocated according to an index order that the data NLRUs are allocated.

7. The method of claim 6, wherein the index order is a descending order starting from a greatest index among indices of data NLRUs.

8. The method of claim 7, wherein the guard NLRUs are mapped after the data NLRUs are mapped.

9. A method of processing data in a multiple-carrier system, the multiple-carrier system including a carrier including a first guard band, a data band, and a second guard band in ascending order of frequency, the method comprising:
    receiving first data through guard miniband logical resource units (NLRUs) in a frequency partition from a base station, the guard NLRUs being mapped from guard physical resource units (PRUs) in the first guard band and the second guard band, the guard PRUs being indexed such that a first guard PRU in the first guard band and a second guard PRU in the second guard band are indexed in turn; and
    processing the received first data,
    wherein the guard PRUs are indexed by the equation as follows:

$$GPRUN[i]=PRU1[i/2], \text{ for even } i$$

$$GPRUN[i]=PRU2[(i-1)/2], \text{ for odd } i,$$

where GRPU[i] is a re-arranged guard PRU, "i" is an index number, PRU1 is the first guard PRU in the first guard band, and PRU2 is the second guard PRU in the second guard band.

10. The method of claim 9, wherein the frequency partition is a reuse-1 region among a plurality of frequency partitions.

11. The method of claim 9, wherein each of the guard PRUs consists of 18 physically contiguous subcarriers.

12. The method of claim 9, further comprising receiving second data through data NLRUs in the frequency partition from the base station, the data NLRUs being mapped from data PRUs in the data band.

13. The method of claim 12, wherein the guard NLRUs and the data NLRUs are allocated together to the user equipment.

14. The method of claim 12, wherein the guard NLRUs are allocated according to an index order that the data NLRUs are allocated.

15. The method of claim 14, wherein the index order is a descending order starting from a greatest index among indices of data NLRUs.

16. The method of claim 12, wherein the guard NLRUs are mapped after the data NLRUs are mapped.

17. A user equipment in a multi-carrier system, a carrier including a first guard band, a data band, and a second guard band in ascending order of frequency, the user equipment comprising:
- a radio frequency (RF) unit configured to transmit or receive a radio signal; and
- a processor, coupled to the RF unit, and configured to:
  - receive data through guard miniband logical resource units (NLRUs) in a frequency partition from a base station, the guard NLRUs being mapped from guard physical resource units (PRUs) in the first guard band and the second guard band, the guard PRUs being indexed such that a first guard PRU in the first guard band and a second guard PRU in the second guard band are indexed in turn; and
  - process the received data,
  - wherein the guard PRU is indexed by the equation as follows:

$$GPRUN[i]=PRU1[i/2], \text{ for even } i$$

$$GPRUN[i]=PRU2[(i-1)/2], \text{ for odd } i,$$

where GRPU[i] is a re-arranged guard PRU, "i" is an index number, PRU1 is the first guard PRU in the first guard band, and PRU2 is the second guard PRU in the second guard band.

* * * * *